United States Patent [19]

Faulstick

[11] Patent Number: 5,029,709
[45] Date of Patent: Jul. 9, 1991

[54] PACKAGE FOR SECURELY CONTAINING A GENERALLY RECTANGULOID ARTICLE

[75] Inventor: Luke T. Faulstick, Rochester, N.Y.

[73] Assignee: Eastman Kodak Company, Rochester, N.Y.

[21] Appl. No.: 605,886

[22] Filed: Oct. 30, 1990

[51] Int. Cl.⁵ .......................... B65D 85/48; B65D 5/00
[52] U.S. Cl. .................... 206/455; 229/131; 229/143; 229/167
[58] Field of Search ................ 206/455; 229/167, 150, 229/143, 131

[56] References Cited

U.S. PATENT DOCUMENTS

| 1,211,223 | 1/1917 | Pinkerton | 229/167 |
|---|---|---|---|
| 1,530,643 | 3/1925 | Blandford | 229/150 |
| 1,810,956 | 6/1931 | Frankenstein | 229/150 |
| 3,368,735 | 2/1968 | Levi | 229/167 |
| 3,820,708 | 6/1974 | Sieffert | 229/167 |
| 4,093,069 | 6/1978 | Smolderen | 206/455 |
| 4,171,742 | 10/1979 | Kohayakawa et al. | 206/449 |
| 4,552,268 | 11/1985 | Lee | 206/455 |
| 4,828,106 | 5/1989 | Akao et al. | 206/316.1 |

Primary Examiner—Jimmy G. Foster
Assistant Examiner—M. D. Patterson
Attorney, Agent, or Firm—William C. Dixon, III

[57] ABSTRACT

A package for securely containing a generally rectanguloid article comprises a rectanguloid box that is closable to protectively enclose the article and openable to allow ready access thereto. The box when closed has a bottom wall, spaced-panel opposite side walls, a rear end wall, a top wall, and a multi-panel front end wall. All of the box walls are formed from a single pre-cut and -scored blank of corrugated paperboard, which includes various panels, flaps, and tabs that are adapted to be folded about respective score lines and positioned in cooperative relation to one another to provide the closable and openable box desired for securely containing the article.

7 Claims, 7 Drawing Sheets

PACKAGE FOR SECURELY CONTAINING A GENERALLY RECTANGULOID ARTICLE

BACKGROUND OF THE INVENTION

1. Field of the Invention

The present invention relates generally to packaging, and particularly to a packaging arrangement for securely containing a generally rectanguloid article that may include light-sensitive material.

2. Description of the Prior Art

Packaging arrangements for containing rectanguloid articles including photosensitive sheets are well known in the prior art. Examples may be found in the following patents:

U.S. Pat. No. 4,171,742 (Kohayakawa et al.)—Discloses a corrugated fiberboard box for protectively enclosing a rectangular stack of photosensitive sheets or plates, the box being formed from a pre-cut and -scored blank that is folded to provide a bottom section, opposing side sections, complemental top half-sections, and complemental bottom and top, folded-around, opposing end sections.

U.S. Pat. No. 4,552,268 (Lee)—Discloses a flip-top outer carton enclosing an open-ended inner carton containing x-ray or other light-sensitive film, the outer carton having a rupturable top portion permitting its top end to be opened for access to the inner carton and then reclosed in a light-tight manner.

While prior-art arrangements such as those described above may have sufficed for their own particular purposes, there has remained, nonetheless, a need for an improved packaging arrangement that is especially adapted for efficient on-line fabrication to protectively contain a rectanguloid article including light-sensitive material, and which is equally adapted for convenient opening and light-tight reclosing when in use.

An overall object of this invention, therefore, has been to provide a packaging arrangement that meets the foregoing need, and to do so in a practical, cost-effective, and reliable manner.

SUMMARY OF THE INVENTION

In accordance with that object, and as shown and described herein, the present invention finds utility in a package for securely containing a generally rectanguloid article, the package comprising a rectanguloid box that is closable to protectively enclose the article and openable to allow ready access thereto. The box when closed has a bottom wall, opposite side walls, a rear end wall, a top wall, and a front end wall. All of the box walls are formed from a single pre-cut and -scored blank of corrugated paperboard, which includes various panels, flaps, and tabs that are adapted to be folded about respective score lines and positioned in cooperative relation to one another to provide the closable and openable box desired for securely containing the article.

More particularly, the pre-cut and -scored blank of corrugated paperboard includes:

a rectangular bottom-wall panel defined by transverse front and rear score lines and longitudinal opposite side score lines;

rectangular opposite-side-wall outer side panels defined by the bottom-wall-panel opposite side score lines respectively, longitudinal opposite-side-wall outer-side-panel score lines respectively, and transverse opposite-side-wall outer-side-panel front and rear edges;

opposite-side-wall top panels defined by the opposite-side-wall outer-side-panel score lines respectively, longitudinal opposite-side-wall top-panel score lines respectively, and transverse opposite-side-wall top-panel front and rear edges;

opposite-side-wall inner side panels defined by the opposite-side-wall top-panel score lines respectively, longitudinal opposite-side-wall inner-side-panel score lines respectively, and transverse opposite-side-wall inner-side-panel front and rear edges;

opposite-side-wall bottom panels defined by the opposite-side-wall inner-side-panel score lines respectively, longitudinal opposite-side-wall bottom-panel side edges respectively, and transverse opposite-side-wall bottom-panel front and rear edges;

a front-end-wall inner panel defined by the bottom-wall-panel front score line, a substantially transverse front-end-wall inner-panel boundary, and front-end-wall inner-panel opposite side edges;

a rectangular rear-end-wall panel defined by the bottom-wall-panel rear score line, a transverse rear-end-wall-panel score line, and longitudinal rear-end-wall-panel opposite side edges;

a rectangular top-wall panel defined by the rear-end-wall-panel score line, a transverse top-wall-panel score line, and longitudinal top-wall-panel opposite side boundaries;

top-wall side panels defined by at least forward portions of the top-wall-panel opposite side boundaries respectively, respective top-wall side-panel side and rear boundaries, and respective transverse top-wall side-panel front score lines disposed substantially in alignment with the top-wall-panel score line;

top-wall side-panel tuck-in tabs extending substantially longitudinally from the top-wall side-panel front score lines respectively to top-wall side-panel tuck-in-tab outer edges respectively;

a rectangular front-end-wall outer panel defined by the top-wall-panel score line, a transverse front-end-wall outer-panel score line, and longitudinal front-end-wall outer-panel opposite side edges;

a front-end-wall bottom panel defined by the front-end-wall outer-panel score line, a transverse front-end-wall bottom-panel score line, and front-end-wall bottom-panel opposite side edges; and a front-end-wall intermediate panel defined by the front-end-wall bottom-panel score line, a transverse front-end-wall intermediate-panel end edge, and front-end-wall intermediate-panel opposite side edges;

the bottom-wall panel as defined by the front and rear score lines and opposite side score lines thereof forming the box bottom wall;

the opposite-side-wall outer side panels being folded about the bottom-wall-panel opposite side score lines, respectively, into spaced confronting relation with each other;

the opposite-side-wall top panels being folded about the opposite-side-wall outer-side-panel score lines, respectively, into spaced confronting relation with opposite side portions of the bottom-wall panel respectively;

the opposite-side-wall inner side panels being folded about the opposite-side-wall top-panel score lines, respectively, into spaced confronting relation with each other and with the folded opposite-side-wall outer side panels respectively;

the opposite-side-wall bottom panels being folded about the opposite-side-wall inner-side-panel score lines, respectively, into adjacent confronting relation with the opposite side portions of the bottom-wall panel, respectively, and into spaced confronting relation with the folded opposite-side-wall top panels respectively;

the top-wall side panels being folded about said at least forward portions of the top-wall-panel opposite side boundaries, respectively, into spaced confronting relation with each other;

the top-wall side-panel tuck-in tabs being folded about the top-wall side-panel front score lines, respectively, toward and into substantial alignment with each other;

the front-end-wall outer panel being folded about the top-wall-panel score line into adjacent confronting relation with the folded top-wall side-panel tuck-in tabs;

the front-end-wall bottom panel being folded about the front-end-wall outer-panel score line into confronting relation with edges of the folded top-wall side-panel tuck-in tabs;

the front-end-wall intermediate panel being folded about the front-end-wall bottom-panel score line into adjacent confronting relation with the folded top-wall side-panel tuck-in tabs;

the front-end-wall inner panel being folded about the bottom-wall-panel front score line so as to move opposite side portions of the inner panel into adjacent confronting relation with the front edges of the folded opposite-side-wall panels respectively;

the rear-end-wall panel being folded about the bottom-wall-panel rear score line so as to move opposite side portions of the rear-end-wall panel into adjacent confronting relation with the rear edges of the folded opposite-side-wall panels respectively; and the top-wall panel then being folded forwardly and downwardly about the rear-end-wall-panel score line so as to move opposite side portions of the folded top-wall panel into proximate relation with the folded opposite-side-wall top panels respectively, and the folded top-wall side panels into proximate relation with the folded opposite-side-wall outer side panels respectively, and so as to move the folded front-end-wall intermediate panel into adjacent confronting relation with the folded front-end-wall inner panel, and thereby close the box;

whereupon the opposite-side-wall outer side, top, inner side, and bottom panels as folded, together with the top-wall side panels as folded, form the closed box opposite side walls respectively, the rear-end-wall panel as folded forms the closed box rear end wall, the top-wall panel as folded forms at least part of the closed box top wall, and the front-end-wall inner panel as folded, together with the front-end-wall outer, bottom, and intermediate panels as folded, forms the closed box front end wall;

at least a forward part of the folded top-wall panel also being foldable upwardly and rearwardly in order to move the opposite side portions thereof and the folded top-wall side panels away from the folded opposite-side-wall top and outer side panels respectively, and the folded front-end-wall outer, bottom, and intermediate panels away from the folded front-end-wall inner panel, to thereby allow access to the inner panel; and the folded front-end-wall inner panel then being foldable about the bottom-wall-panel front score line to move the inner panel away from the front edges of the folded opposite-side-wall panels, and thereby open the box.

This invention, and its objects and advantages, will become more apparent in the detailed description of the illustrated embodiments thereof presented hereinbelow.

BRIEF DESCRIPTION OF THE DRAWINGS

In the detailed description of three embodiments of this invention set forth below, reference is made to the accompanying drawings, wherein like reference characters denote like elements, and wherein.

DESCRIPTION OF THE ILLUSTRATED EMBODIMENTS

Because certain parts of article packaging arrangements are well known, the following description is directed in particular to those elements forming, cooperating directly with, or relating especially to, this invention. Elements not specifically shown or described herein are selectable from those known in the pertinent art.

With regard to all three embodiments described below, the term "rectanguloid" is intended to denote a shape generally conforming to that of a rectangular parallelepiped, or rectangular solid. By way of example, the aforementioned rectanguloid article may comprise a thermoformed plastic tray containing a stack of rectangular photosensitive film sheets initially covered by an opaque foil peelably sealed across its top, the rectanguloid box of this invention then being compatibly configured to securely enclose such a tray.

THE FIRST EMBODIMENT

Figure 1:
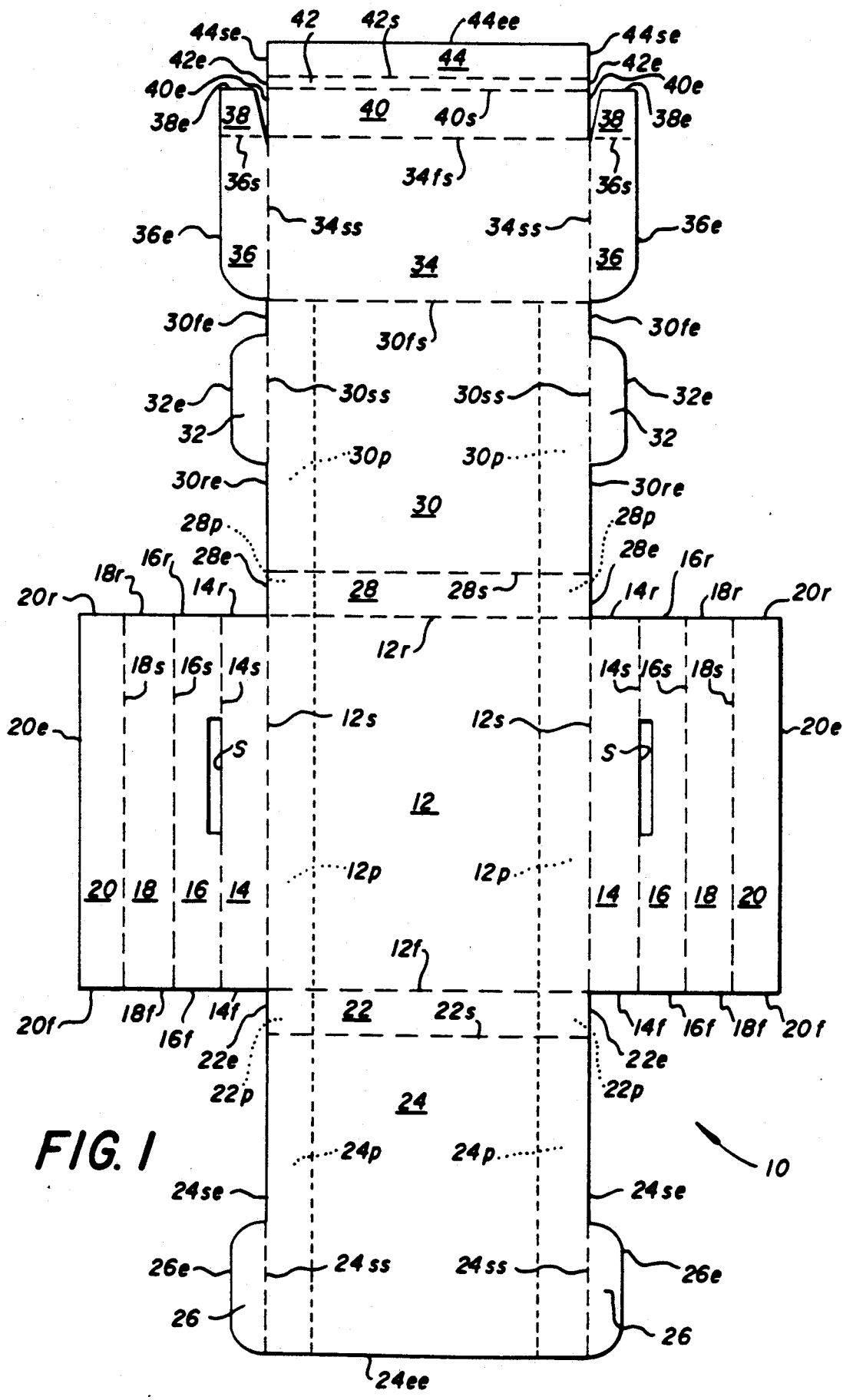
FIG. 1 is a top-plan view of the paperboard blank from which a box according to a first embodiment of this invention is formed.
Figure 2:
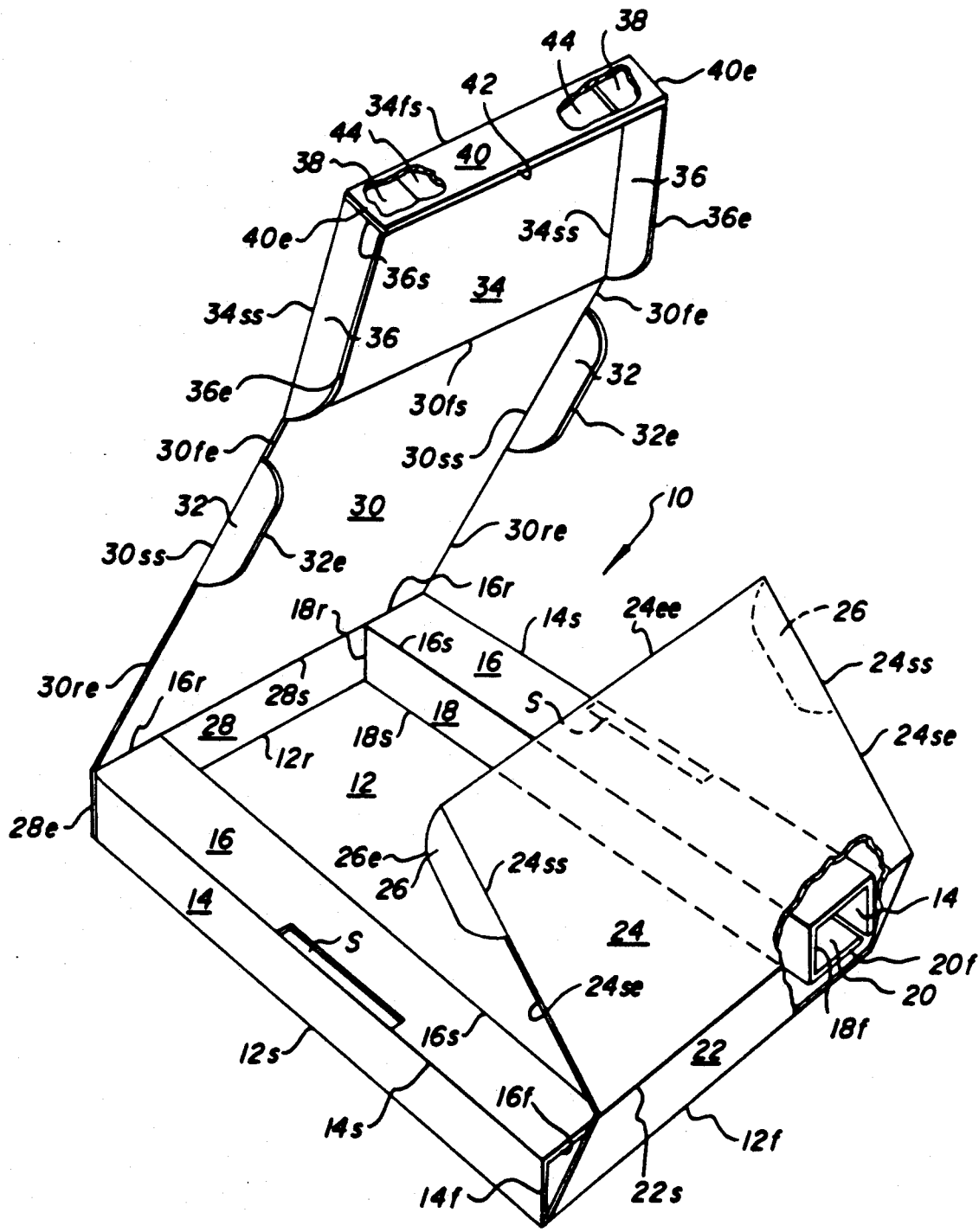
FIG. 2 is a perspective view showing the blank of FIG. 1 as partially folded to form a box in accordance with the first embodiment.

As indicated above, FIGS. 1-4a illustrate a first embodiment of the present invention. FIG. 1 depicts a single pre-cut and -scored blank 10 of corrugated paperboard from which a rectanguloid box B according to the first embodiment is formed. Blank 10 is provided with the following panels and tabs:

a rectangular bottom-wall panel 12 defined by transverse front and rear score lines 12f and 12r and longitudinal opposite side score lines 12s;

rectangular opposite-side-wall outer side panels 14 defined by the bottom-wall-panel opposite side score lines 12s respectively, longitudinal opposite-side-wall outer-side-panel score lines 14s respectively, and transverse opposite-side-wall outer-side-panel front and rear edges 14f and 14r;

opposite-side-wall top panels 16 defined by the opposite-side-wall outer-side-panel score lines 14s respectively, longitudinal opposite-side-wall top-panel score lines 16s respectively, and transverse opposite-side-wall top-panel front and rear edges 16f and 16r, each of the top panels 16 having a longitudinal slot S therein parallel with and adjacent to a medial portion of the outer-side-panel score line 14s;

opposite-side-wall inner side panels 18 defined by the opposite-side-wall top-panel score lines 16s respectively, longitudinal opposite-side-wall inner-side-panel score lines 18s respectively, and transverse opposite-side-wall inner-side-panel front and rear edges 18f and 18r;

opposite-side-wall bottom panels 20 defined by the opposite-side-wall inner-side-panel score lines 18s respectively, longitudinal opposite-side-wall bottom-panel side edges 20e respectively, and transverse opposite-side-wall bottom-panel front and rear edges 20f and 20r;

a front-end-wall inner panel 22 defined by the bottom-wall-panel front score line 12f, a transverse front-end-wall inner-panel score line 22s, and front-end-wall inner-panel opposite side edges 22e;

a top-wall inner panel 24 defined by the front-end-wall inner-panel score line 22s, a transverse top-wall inner-panel end edge 24ee, top-wall inner-panel opposite side edges 24se extending from respective opposite ends of the front-end-wall inner-panel score line 22s toward the top-wall inner-panel end edge 24ee, and top-wall inner-panel opposite side score lines 24ss extending from respective opposite ends of the top-wall inner-panel end edge 24ee to the top-wall inner-panel opposite side edges 24se respectively;

top-wall inner-panel opposite side tuck-in tabs 26 extending laterally from the top-wall inner-panel opposite side score lines 24ss respectively to top-wall inner-panel opposite side tuck-in-tab outer edges 26e respectively, each of the top-wall inner-panel tuck-in tabs 26 being configured to fit matingly into one of the opposite-side-wall top-panel slots S;

a rectangular rear-end-wall panel 28 defined by the bottom-wall-panel rear score line 12r, a transverse rear-end-wall-panel score line 28s, and longitudinal rear-end-wall-panel opposite side edges 28e;

a rectangular top-wall rearward outer panel 30 defined by the rear-end-wall-panel score line 28s, a transverse top-wall rearward-outer-panel forward score line 30fs, longitudinal top-wall rearward-outer-panel rearward opposite side edges 30re extending normally from respective opposite ends of the rear-end-wall-panel score line 28s, longitudinal top-wall rearward-outer-panel forward opposite side edges 30fe extending normally from respective opposite ends of the top-wall rearward-outer-panel forward score line 30fs, and longitudinal top-wall rearward-outer-panel opposite side score lines 30ss extending respectively from the rearward opposite side edges 30re to the forward opposite side edges 30fe;

top-wall rearward-outer-panel opposite side tuck-in tabs 32 extending laterally from the rearward-outer-panel opposite side score lines 30ss respectively to rearward-outer-panel opposite side tuck-in-tab outer edges 32e respectively, each of the rearward-outer-panel tuck-in tabs 32 being configured to fit matingly into one of the opposite-side-wall top-panel slots S;

a rectangular top-wall forward outer panel 34 defined by the top-wall rearward-outer-panel forward score line 30fs, a transverse top-wall forward-outer-panel front score line 34fs, and longitudinal top-wall forward-outer-panel opposite side score lines 34ss;

top-wall forward-outer-panel opposite side panels 36 defined by the forward-outer-panel opposite side score lines 34ss respectively, opposite-side-panel outer edges 36e respectively, and respective transverse opposite-side-panel score lines 36s disposed substantially in alignment with the forward-outer-panel front score line 34fs;

opposite-side-panel tuck-in tabs 38 extending substantially longitudinally from the opposite-side-panel score lines 36s respectively to opposite-side-panel tuck-in-tab outer edges 38e respectively;

a rectangular front-end-wall outer panel 40 defined by the top-wall forward-outer-panel front score line 34fs, a transverse front-end-wall outer-panel score line 40s, and longitudinal front-end-wall outer-panel opposite side edges 40e;

a front-end-wall bottom panel 42 defined by the front-end-wall outer-panel score line 40s, a transverse front-end-wall bottom-panel score line 42s, and front-end-wall bottom-panel opposite side edges 42e; and a front-end-wall intermediate panel 44 defined by the front-end-wall bottom-panel score line 42s, a transverse front-end-wall intermediate-panel end edge 44ee, and front-end-wall intermediate-panel opposite side edges 44se.

As seen best by reference to all of FIGS. 1–4, the foregoing panels and tabs of blank 10 are folded about their respective score lines to form the various walls of closable and openable box B as follows:

the bottom-wall panel 12 as defined by the front and rear score lines 12f and 12r and opposite side score lines 12s thereof forms the box bottom wall Bb;

the opposite-side-wall outer side panels 14 are folded about the bottom-wall-panel opposite side score lines 12s, respectively, into spaced confronting relation with each other;

the opposite-side-wall top panels 16 are folded about the opposite-side-wall outer-side-panel score lines 14s, respectively, into spaced confronting relation with opposite side portions 12p of the bottom-wall panel 12 respectively;

the opposite-side-wall inner side panels 18 are folded about the opposite-side-wall top-panel score lines 16s, respectively, into spaced confronting relation with each other and with the folded opposite-side-wall outer side panels 14 respectively;

the opposite-side-wall bottom panels 20 are folded about the opposite-side-wall inner-side-panel score lines 18s, respectively, into adjacent confronting relation with the opposite side portions 12p of the bottom-wall panel 12, respectively, and into spaced confronting relation with the folded opposite-side-wall top panels 16 respectively;

the top-wall inner-panel opposite side tuck-in tabs 16 are folded about the top-wall inner-panel opposite side score lines 24ss, respectively, into spaced confronting relation with each other;

the top-wall rearward-outer-panel opposite side tuck-in tabs 32 are folded about the rearward-outer-panel opposite side score lines 30ss, respectively, into spaced confronting relation with each other;

the top-wall forward-outer-panel opposite side panels 36 are folded about the forward-outer-panel opposite side score lines 34ss, respectively, into spaced confronting relation with each other;

the opposite-side-panel tuck-in tabs 38 are folded about the opposite-side-panel score lines 36s, respectively, toward and into substantial alignment with each other;

the front-end-wall outer panel 40 is folded about the top-wall forward-outer-panel front score line 34fs into adjacent confronting relation with the folded opposite-side-panel tuck-in tabs 38;

the front-end-wall bottom panel 42 is folded about the front-end-wall outer-panel score line 40s into confronting relation with edges of the folded opposite-side-panel tuck-in tabs 38;

the front-end-wall intermediate panel 44 is folded about the front-end-wall bottom-panel score line 42s into adjacent confronting relation with the folded opposite-side-panel tuck-in tabs 38;

the front-end-wall inner panel 22 is folded about the bottom-wall-panel front score line 12f so as to move opposite side portions 22p of the inner panel 22 into adjacent confronting relation with the front edges 14f, 16f, 18f, and 20f of the folded opposite-side-wall panels 14, 16, 18, and 20 respectively;

the rear-end-wall panel 28 is folded about the bottom-wall-panel rear score line 12r so as to move opposite side portions 28p of the rear-end-wall panel 28 into adjacent confronting relation with the rear edges 14r, 16r, 18r, and 20r of the folded opposite-side-wall panels 14, 16, 18, and 20 respectively;

the top-wall inner panel 24 is folded rearwardly and downwardly about the front-end-wall inner-panel score line 22s so as to move the folded top-wall inner-panel tuck-in tabs 26 into the slots S in the folded opposite-side-wall top panels 16 respectively, and so as to move opposite side portions 24p of the top-wall inner panel 24 into adjacent confronting relation with the folded opposite-side-wall top panels 16 respectively; and the top-wall rearward and forward outer panels 30 and 34 together are then folded forwardly and downwardly about the rear-end-wall-panel score line 28s so as to move the folded top-wall rearward-outer-panel tuck-in tabs 32 into the slots S in the folded opposite-side-wall top panels 16 respectively, so as to move opposite side portions 30p of the top-wall rearward outer panel 30 into adjacent confronting relation with the folded opposite-side-wall top panels 16 respectively, and the top-wall forward outer panel 34 into adjacent confronting relation with the folded top-wall inner panel 24, so as to move the folded top-wall forward-outer-panel opposite side panels 36 into adjacent confronting relation with the folded opposite-side-wall outer side panels 14 respectively, and so as to move the folded front-end-wall intermediate panel 44 into adjacent confronting relation with the folded front-end-wall inner panel 22, and thereby close the box B;

whereupon the opposite-side-wall outer side, top, inner side, and bottom panels 14, 16, 18, and 20 as folded, together with the top-wall forward-outer-panel opposite side panels 36 as folded, form the closed box opposite side walls Bs respectively, the rear-end-wall panel 28 as folded forms the closed box rear end wall Br, the top-wall inner and outer panels 24, 30, and 34 as folded together form the closed box top wall Bt, and the front-end-wall inner panel 22 as folded, together with the front-end-wall outer, bottom, and intermediate panels 40, 42, and 44 as folded, forms the closed box front end wall Bf;

the top-wall forward outer panel 34 being foldable upwardly and rearwardly about the top-wall rearward-outer-panel forward score line 30fs in order to move the forward outer panel 34 and the folded opposite side panels 36 away from the folded top-wall inner panel 24 and the folded opposite-side-wall outer side panels 14 respectively, and the folded front-end-wall outer, bottom, and intermediate panels 40, 42, and 44 away from the folded front-end-wall inner panel 22, and thereby allow access to the top-wall and front-end-wall inner panels 24 and 22; and the folded top-wall and front-end-wall inner panels 24 and 22 then being foldable upwardly and forwardly about the front-end-wall inner-panel score line 22s and the bottom-wall-panel front score line 12f, respectively, to move the inner panels 24 and 22 away from the folded opposite-side-wall top panels 16 and front edges 14f, 16f, 18f, and 20f, respectively, and thereby open the box B to gain access to the enclosed article A.

Figure 4A:
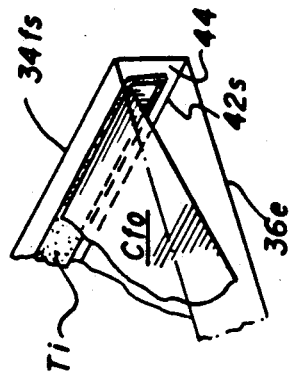
FIG. 4a is a fragmentary perspective view revealing part of the opened box of FIG. 4 as prepared for light-tight reclosing.
Figure 4:
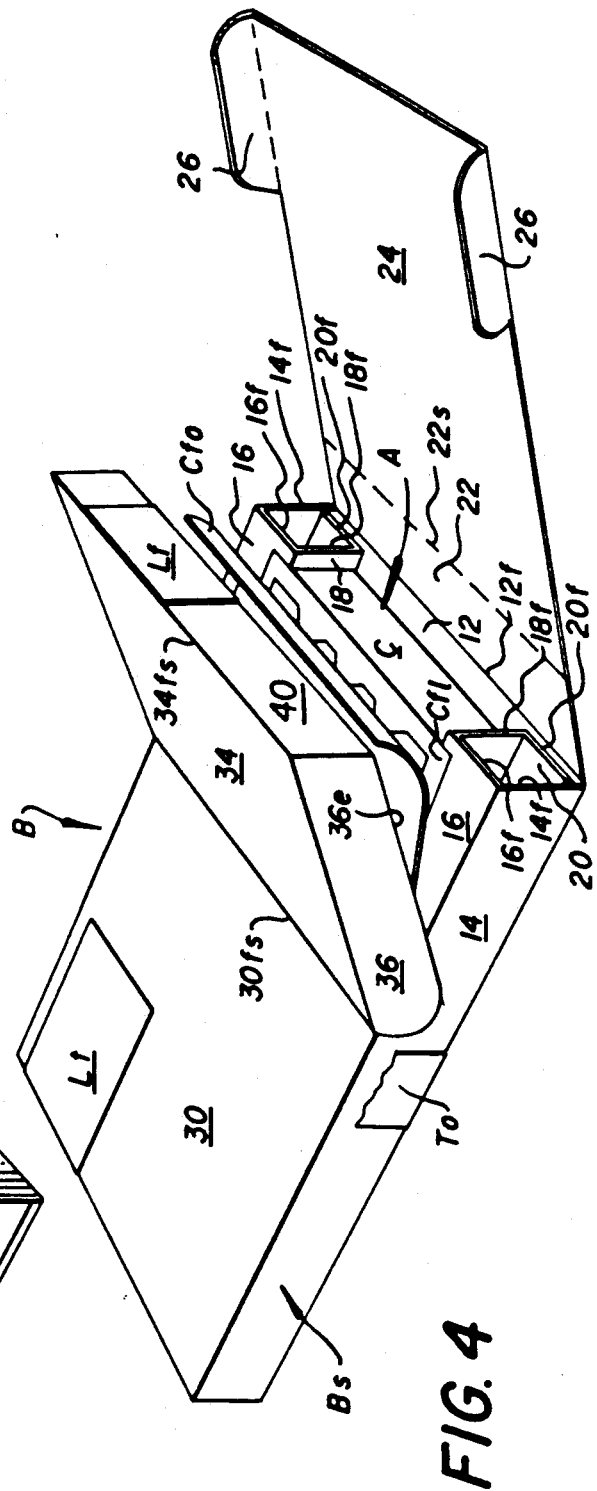
FIG. 4 is a perspective view illustrating the box of FIG. 3 as partially opened to provide access to an article contained therein.

The rectanguloid article A shown in FIG. 4 is a film-sheet container C, of the plastic-tray type referred to above, snugly nestled between the opposite-side-wall inner side panels 18. Projecting laterally outward from all four sides of container C, at the top thereof, is a perimetric flange Cfl, whose side portions are seen overlapping the opposite-side-wall top panels 16. As initially received for enclosure within box B, container C is covered by a rectangular opaque foil Cfo peelably sealed to the upward-facing surface of the flange Cfl. The foil Cfo is shown in FIG. 4 with its front end portion peeled upwardly away from the flange, as would normally be done by the user upon opening the box. To help ensure light-tightness upon reclosing the box, the front end of the foil is adhered by the user to the inward-facing surface of the front-end-wall intermediate panel 44 via a strip of double-backed tape Ti, as illustrated in FIG. 4a.

Figure 3:
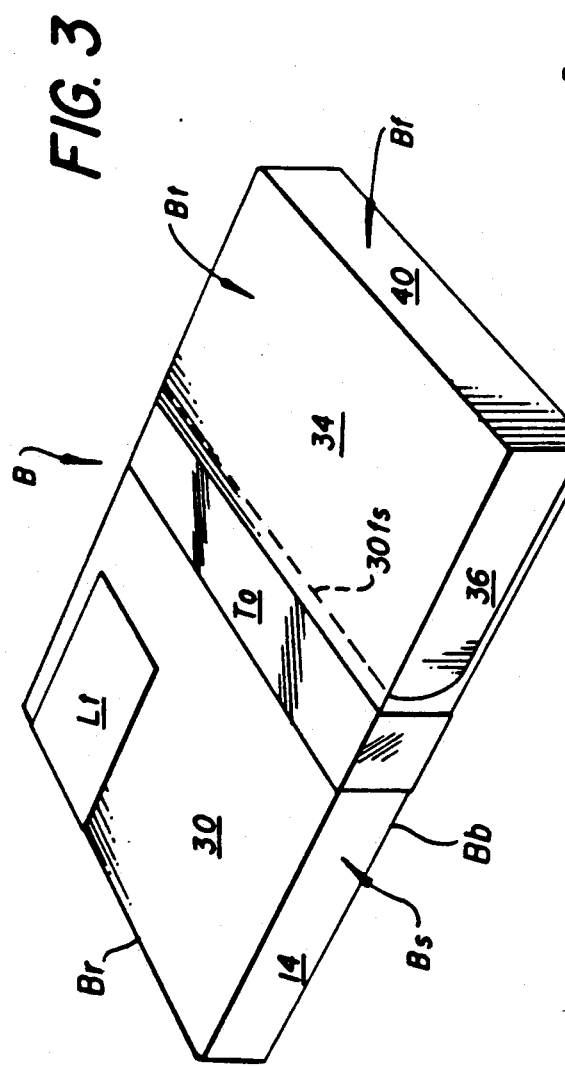
FIG. 3 is a perspective view depicting the blank of FIGS. 1 and 2 as fully folded to form the box according to the first embodiment.

FIG. 3 illustrates the fully closed box B as identified by a product-information label Lt adhered to a corner area of its top-wall rearward outer panel 30, and as sealed closed by an outer wrap of case-sealing tape To. In this condition, the box can safely be used as both a light-tight storing and carrying box and a durable shipping case, with protection of its contents enhanced by the folded-multipanel opposite side walls Bs, top wall Bt, and front end wall Bf. FIG. 4 shows the tape To severed and partially removed to facilitate opening the box, and reveals an optional label Lf placed on the front-end-wall outer panel 40 for ready reference by the user.

THE SECOND EMBODIMENT

Figure 5:
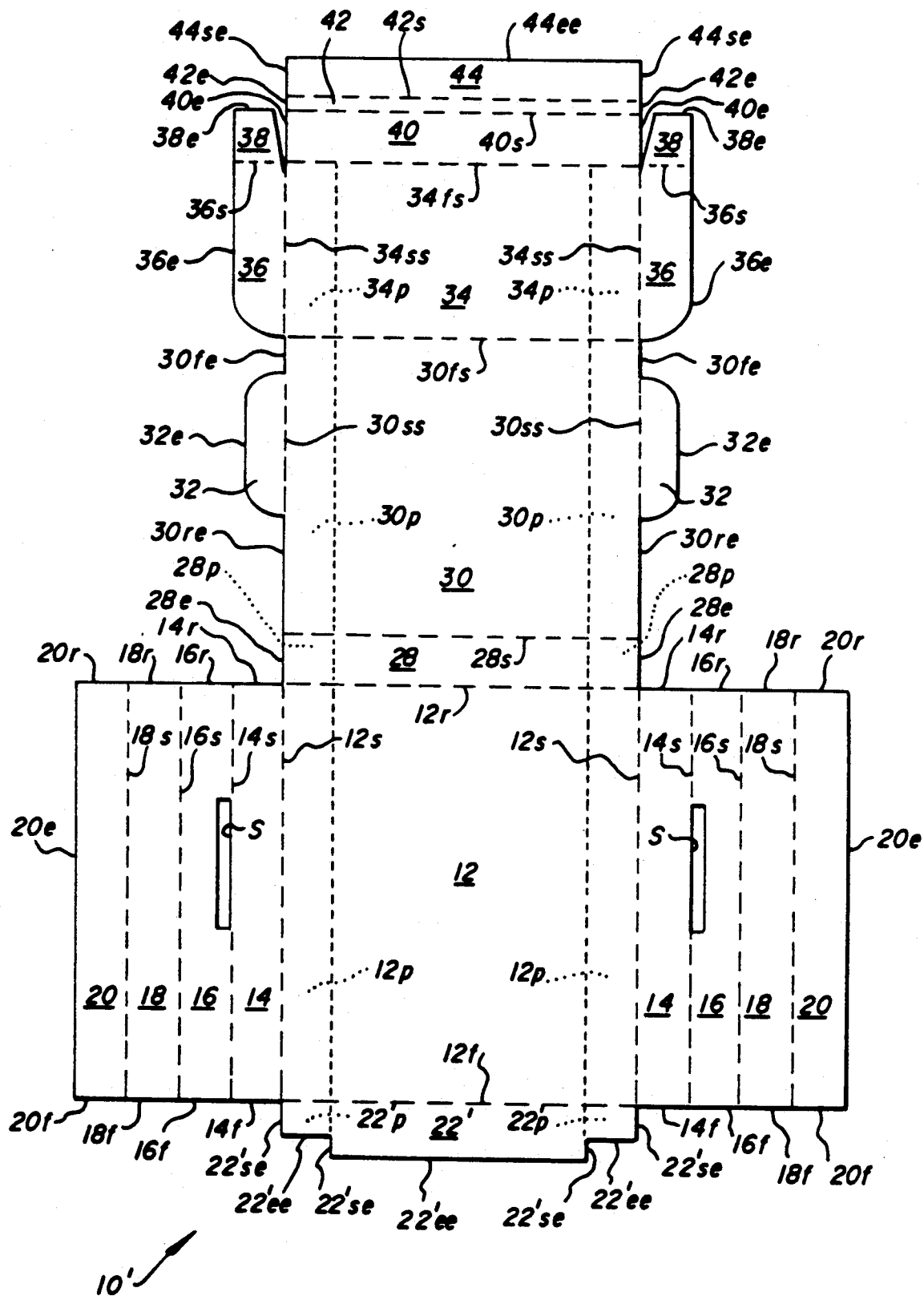
FIG. 5 is a top-plan view similar to FIG. 1 but showing the paperboard blank from which a box is formed in accordance with a second embodiment of this invention.
Figure 6:
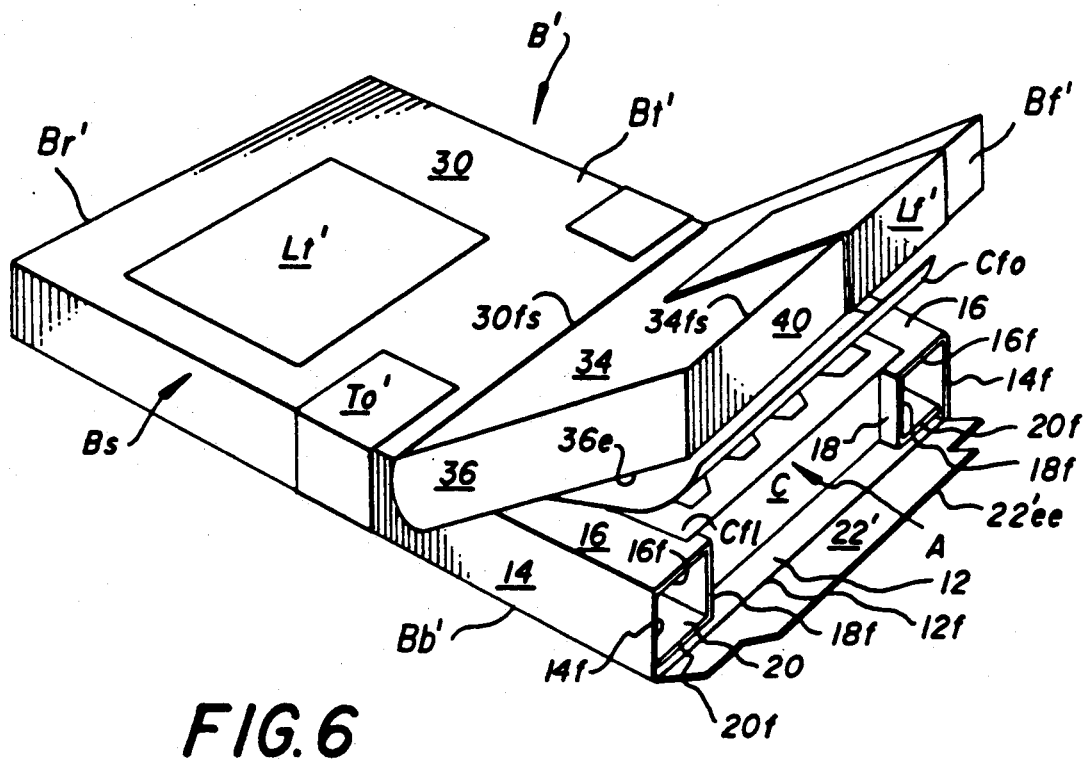
FIG. 6 is a perspective view similar to FIG. 4 but depicting the box formed from the blank of FIG. 5 as partially opened to provide access to an article contained therein.
Figure 6A:
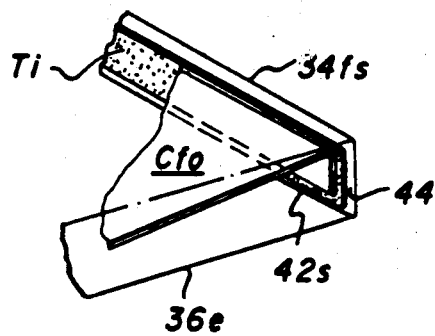
FIG. 6a is a fragmentary perspective view similar to FIG. 4a but revealing part of the opened box of FIG. 6 as prepared for light-tight reclosing.

FIGS. 5-6a illustrate a similar, but more economical and convenient, second embodiment of this invention. In these figures, elements identical to those in FIGS. 1-4a are designated by the same reference characters there used, while elements different from those in FIGS. 1-4a are distinguished by different reference characters or corresponding characters primed. FIG. 5 depicts a single pre-cut and -scored blank 10' of corrugated paperboard from which a rectanguloid box B' according to the second embodiment is formed. Blank 10' is provided with the following panels and tabs:

a rectangular bottom-wall panel 12 defined by transverse front and rear score lines 12f and 12r and longitudinal opposite side score lines 12s;

rectangular opposite-side-wall outer side panels 14 defined by the bottom-wall-panel opposite side score lines 12s respectively, longitudinal opposite-side-wall outer-side-panel score lines 14s respectively, and transverse opposite-side-wall outer-side-panel front and rear edges 14f and 14r;

opposite-side-wall top panels 16 defined by the opposite-side-wall outer-side-panel score lines 14s respectively, longitudinal opposite-side-wall top-panel score lines 16s respectively, and transverse opposite-side-wall top-panel front and rear edges 16f and 16r, each of the top panels 16 having a longitudinal slot S therein parallel with and adjacent to a medial portion of the outer-side-panel score line 14s;

opposite-side-wall inner side panels 18 defined by the opposite-side-wall top-panel score lines 16s respectively, longitudinal opposite-side-wall inner-side-panel score lines 18s respectively, and transverse opposite-side-wall inner-side-panel front and rear edges 18f and 18r;

opposite-side-wall bottom panels 20 defined by the opposite-side-wall inner-side-panel score lines 18s respectively, longitudinal opposite-side-wall bottom-panel side edges 20e respectively, and transverse opposite-side-wall bottom-panel front and rear edges 20f and 20r;

a front-end-wall inner panel 22' defined by the bottom-wall-panel front score line 12f, at least one transverse front-end-wall inner-panel end edge 22'ee, and front-end-wall inner-panel opposite side edges 22'se;

a rectangular rear-end-wall panel 28 defined by the bottom-wall-panel rear score line 12r, a transverse rear-end-wall-panel score line 28s, and longitudinal rear-end-wall-panel opposite side edges 28e;

a rectangular top-wall rearward panel 30 defined by the rear-end-wall-panel score line 28s, a transverse top-wall rearward-panel forward score line 30fs, longitudinal top-wall rearward-panel rearward opposite side edges 30re extending normally from respective opposite ends of the rear-end-wall-panel score line 28s, longitudinal top-wall rearward-panel forward opposite side edges 30fe extending normally from respective opposite ends of the top-wall rearward-panel forward score line 30fs, and longitudinal top-wall rearward-panel opposite side score lines 30ss extending respectively from the rearward opposite side edges 30re to the forward opposite side edges 30fe;

top-wall rearward-panel opposite side tuck-in tabs 32 extending laterally from the rearward-panel opposite side score lines 30ss respectively to rearward-panel opposite side tuck-in-tab outer edges 32e respectively, each of the rearward-panel tuck-in tabs 32 being configured to fit matingly into one of the opposite-side-wall top-panel slots S;

a rectangular top-wall forward panel 34 defined by the top-wall rearward-panel forward score line 30fs, a transverse top-wall forward-panel front score line 34fs, and longitudinal top-wall forward-panel opposite side score lines 34ss;

top-wall forward-panel opposite side panels 36 defined by the forward-panel opposite side score lines 34ss respectively, opposite-side-panel outer edges 36e respectively, and respective transverse opposite-side-panel score lines 36s disposed substantially in alignment with the forward-panel front score line 34fs;

opposite-side-panel tuck-in tabs 38 extending substantially longitudinally from the opposite-side-panel score lines 36s respectively to opposite-side-panel tuck-in-tab outer edges 38e respectively;

a rectangular front-end-wall outer panel 40 defined by the top-wall forward-panel front score line 34fs, a transverse front-end-wall outer-panel score line 40s, and longitudinal front-end-wall outer-panel opposite side edges 40e;

a front-end-wall bottom panel 42 defined by the front-end-wall outer-panel score line 40s, a transverse front-end-wall bottom-panel score line 42s, and front-end-wall bottom-panel opposite side edges 42e; and a front-end-wall intermediate panel 44 defined by the front-end-wall bottom-panel score line 42s, a transverse front-end-wall intermediate-panel end edge 44ee, and front-end-wall intermediate-panel opposite side edges 44se.

As seen best by reference to both FIGS. 5 and 6, the foregoing panels and tabs of blank 10' are folded about their respective score lines to form the various walls of closable and openable box B' as follows:

the bottom-wall panel 12 as defined by the front and rear score lines 12f and 12r and opposite side score lines 12s thereof forms the box bottom wall Bb;

the opposite-side-wall outer side panels 14 are folded about the bottom-wall-panel opposite side score lines 12s, respectively, into spaced confronting relation with each other;

the opposite-side-wall top panels 16 are folded about the opposite-side-wall outer-side-panel score lines 14s, respectively, into spaced confronting relation with opposite side portions 12p of the bottom-wall panel 12 respectively;

the opposite-side-wall inner side panels 18 are folded about the opposite-side-wall top-panel score lines 16s, respectively, into spaced confronting relation with each other and with the folded opposite-side-wall outer side panels 14 respectively;

the opposite-side-wall bottom panels 20 are folded about the opposite-side-wall inner-side-panel score lines 18s, respectively, into adjacent confronting relation with the opposite side portions 12p of the bottom-wall panel 12, respectively, and into spaced confronting relation with the folded opposite-side-wall top panels 16 respectively;

the top-wall rearward-panel opposite side tuck-in tabs 32 are folded about the rearward-panel opposite side score lines 30ss, respectively, into spaced confronting relation with each other;

the top-wall forward-panel opposite side panels 36 are folded about the forward-panel opposite side score lines 34ss, respectively, into spaced confronting relation with each other;

the opposite-side-panel tuck-in tabs 38 are folded about the opposite-side-panel score lines 36s, respectively, toward and into substantial alignment with each other;

the front-end-wall outer panel 40 is folded about the top-wall forward-panel front score line 34fs into adjacent confronting relation with the folded opposite-side-panel tuck-in tabs 38;

the front-end-wall bottom panel 42 is folded about the front-end-wall outer-panel score line 40s into confronting relation with edges of the folded opposite-side-panel tuck-in tabs 38;

the front-end-wall intermediate panel 44 is folded about the front-end-wall bottom-panel score line 42s into adjacent confronting relation with the folded opposite-side-panel tuck-in tabs 38;

the front-end-wall inner panel 22' is folded about the bottom-wall-panel front score line 12f so as to move opposite side portions 22'p of the inner panel 22' into adjacent confronting relation with the front edges 14f, 16f, 18f, and 20f of the folded opposite-side-wall panels 14, 16, 18, and 20 respectively;

the rear-end-wall panel 28 is folded about the bottom-wall-panel rear score line 12r so as to move opposite side portions 28p of the rear-end-wall panel 28 into adjacent confronting relation with the rear edges 14r, 16r, 18r, and 20r of the folded opposite-side-wall panels 14, 16, 18, and 20 respectively; and the top-wall rearward and forward panels 30 and 34 together are then folded forwardly and downwardly about the rear-end-wall-panel score line 28s so as to move the folded top-wall rearward-panel tuck-in tabs 32 into the slots S in the folded opposite-side-wall top panels 16 respectively, so as to move opposite side portions 30p and 34p of the folded top-wall panels 30 and 34 into adjacent confronting relation with the folded opposite-side-wall top panels 16 respectively, and central portions of the folded top-wall panels 30 and 34 into spaced confronting relation with corresponding central portions of the bottom-wall panel 12, so as to move the folded top-wall forward-panel opposite side panels 36 into adjacent confronting relation with the folded opposite-side-wall outer side panels 14 respectively, and so as to move the folded front-end-wall intermediate panel 44 into adjacent confronting relation with the folded front-end-wall inner panel 22', and thereby close the box B';

whereupon the opposite-side-wall outer side, top, inner side, and bottom panels 14, 16, 18, and 20 as folded, together with the top-wall forward-panel opposite side panels 36 as folded, form the closed box opposite side walls Bs respectively, the rear-end-wall panel 28 as folded forms the closed box rear end wall Br, the top-wall rearward and forward panels 30 and 34 as folded together form the closed box top wall Bt', and the front-end-wall inner panel 22' as folded, together with the front-end-wall outer, bottom, and intermediate panels 40, 42, and 44 as folded, forms the closed box front end wall Bf';

the top-wall forward panel 34 being foldable upwardly and rearwardly about the top-wall rearward-panel forward score line 30fs in order to move the forward panel 34 and folded opposite side panels 36 away from the folded opposite-side-wall top and outer side panels 16 and 14 respectively, and the folded front-end-wall outer, bottom, and intermediate panels 40, 42, and 44 away from the folded front-end-wall inner panel 22', to thereby allow access to the inner panel 22'; and the folded front-end-wall inner panel 22' then being foldable about the bottom-wall-panel front score line 12f to move the inner panel 22' away from the front edges 14f, 16f, 18f, and 20f of the folded opposite-side-wall panels 14, 16, 18, and 20, and thereby open the box B' to gain access to the enclosed article A, which is the same film-sheet container C described above with reference to the first embodiment.

FIG. 6a corresponds to FIG. 4a in showing how the front end of container foil Cfo is adhered to the front-end-wall intermediate panel 44 via double-backed tape Ti in this embodiment as in the first. FIG. 6 corresponds to FIG. 4 in showing box B' as partially opened but with modified labels Lt' and Lf' and case-sealing tape To'. The absence of top-wall inner panel 24 and its tuck-in tabs 26 in this embodiment offers both a saving in material cost and a saving in time and effort required to close and open the box.

THE THIRD (PREFERRED) EMBODIMENT

Figure 7:
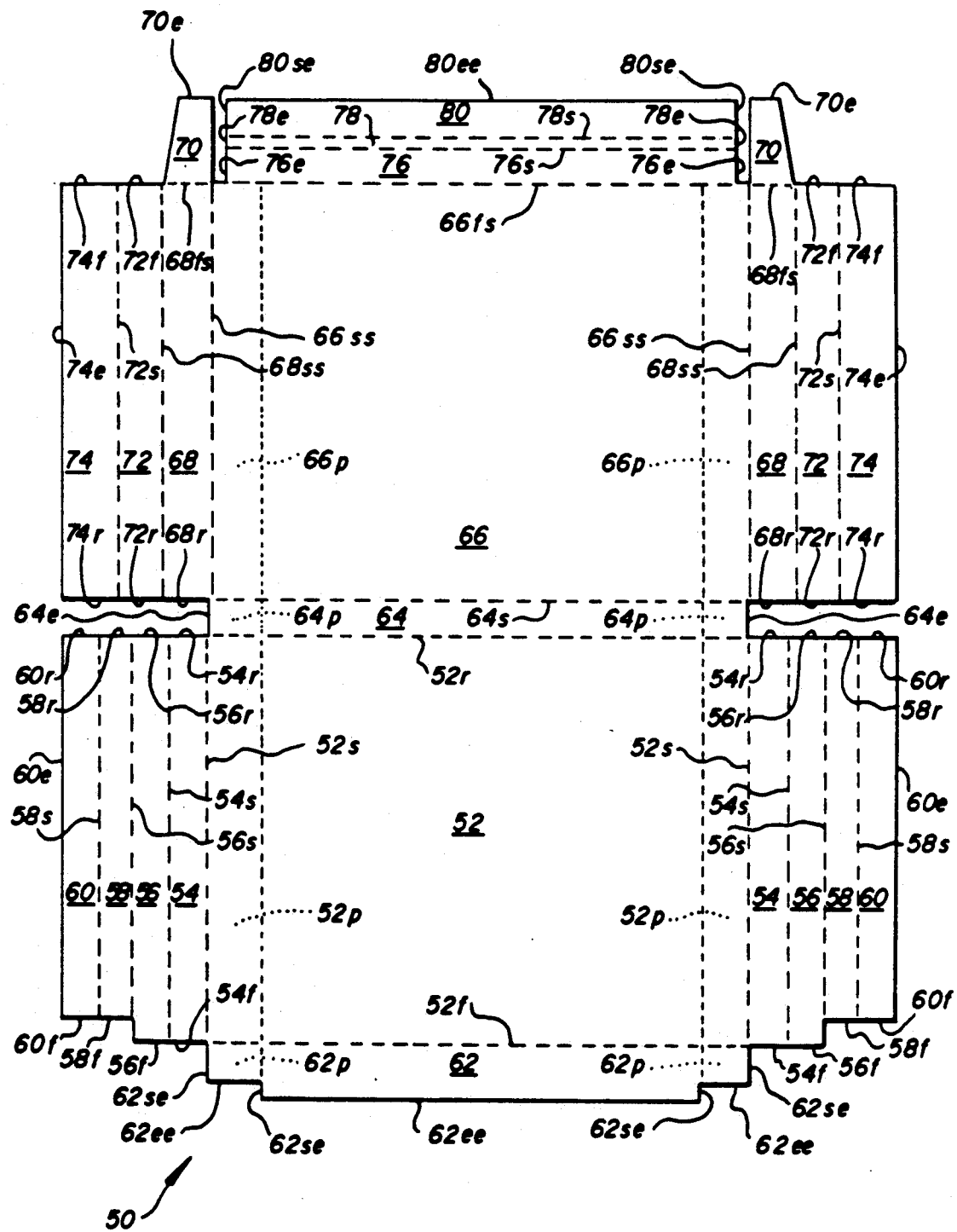
FIG. 7 is a top-plan view similar to FIGS. 1 and 5 but showing the paperboard blank from which a box according to a third (the preferred) embodiment of this invention is formed.
Figure 8:
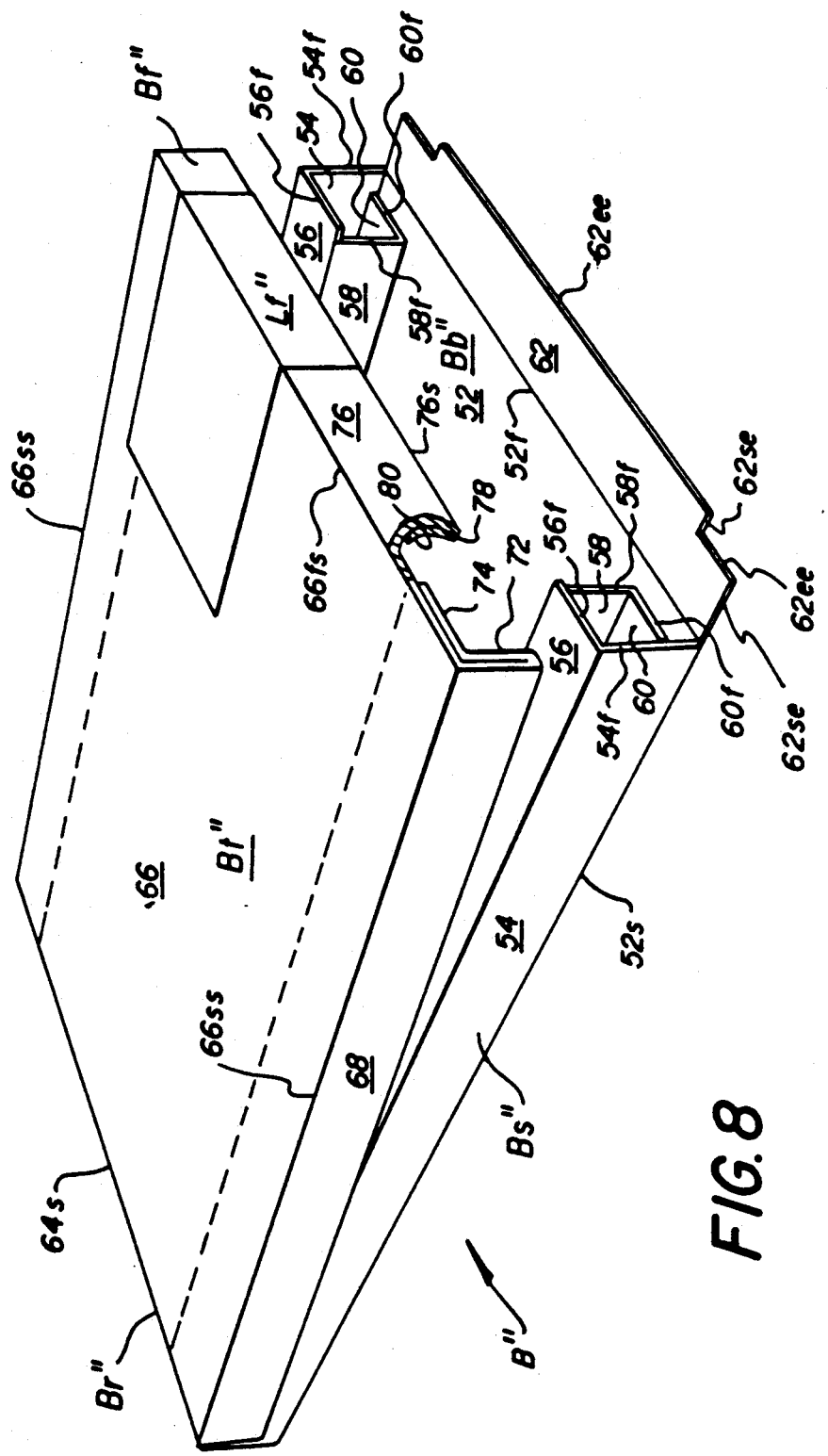
FIG. 8 is a perspective view similar to FIGS. 4 and 6 but illustrating the box formed from the blank of FIG. 7 as partially opened to provide access to its interior.

FIGS. 7 and 8 illustrate a similar, but still more economical and convenient, third (the preferred) embodiment of this invention. In these figures, the various elements are designated by reference characters different from those used in FIGS. 1-6a or by corresponding characters double-primed. FIG. 7 depicts a single pre-cut and -scored blank 50 of corrugated paperboard from which a rectanguloid box B" according to the third embodiment is formed. Blank 50 is provided with the following panels and tabs:

a rectangular bottom-wall panel 52 defined by transverse front and rear score lines 52f and 52r and longitudinal opposite side score lines 52s;

rectangular opposite-side-wall outer side panels 54 defined by the bottom-wall-panel opposite side score lines 52s respectively, longitudinal opposite-side-wall outer-side-panel score lines 54s respectively, and transverse opposite-side-wall outer-side-panel front and rear edges 54f and 54r;

opposite-side-wall top panels 56 defined by the opposite-side-wall outer-side-panel score lines 54s respectively, longitudinal opposite-side-wall top-panel score lines 56s respectively, and transverse opposite-side-wall top-panel front and rear edges 56f and 56r;

opposite-side-wall inner side panels 58 defined by the opposite-side-wall top-panel score lines 56s respectively, longitudinal opposite-side-wall inner-side-panel score lines 58s respectively, and transverse opposite-side-wall inner-side-panel front and rear edges 58f and 58r;

opposite-side-wall bottom panels 60 defined by the opposite-side-wall inner-side-panel score lines 58s respectively, longitudinal opposite-side-wall bottom-panel side edges 60e respectively, and transverse opposite-side-wall bottom-panel front and rear edges 60f and 60r;

a front-end-wall inner panel 62 defined by the bottom-wall-panel front score line 52f, at least one transverse front-end-wall inner-panel end edge 62ee, and front-end-wall inner-panel opposite side edges 62se;

a rectangular rear-end-wall panel 64 defined by the bottom-wall-panel rear score line 52r, a transverse rear-end-wall-panel score line 64s, and longitudinal rear-end-wall-panel opposite side edges 64e;

a rectangular top-wall panel 66 defined by the rear-end-wall-panel score line 64s, a transverse top-wall-panel front score line 66fs, and longitudinal top-wall-panel opposite side score lines 66ss;

rectangular top-wall outer side panels 68 defined by the top-wall-panel opposite side score lines 66ss respectively, longitudinal top-wall outer-side-panel side score lines 68ss respectively, respective transverse top-wall outer-side-panel rear edges 68r, and respective transverse top-wall outer-side-panel front score lines 68fs disposed substantially in alignment with the top-wall-panel front score line 66fs;

top-wall outer-side-panel tuck-in tabs 70 extending substantially longitudinally from the top-wall outerside-panel front score lines 68fs respectively to top-wall outer-side-panel tuck-in-tab outer edges 70e respectively;

top-wall inner side panels 72 defined by the top-wall outer-side-panel side score lines 68ss respectively, longitudinal top-wall inner-side-panel score lines 72s respectively, and transverse top-wall inner-side-panel rear and front edges 72r and 72f;

top-wall inner-side-panel flaps 74 defined by the top-wall inner-side-panel score lines 72s respectively, longitudinal top-wall inner-side-panel-flap side edges 74e respectively, and transverse top-wall inner-side-panel-flap rear and front edges 74r and 74f;

a rectangular front-end-wall outer panel 76 defined by the top-wall-panel front score line 66fs, a transverse front-end-wall outer-panel score line 76s, and longitudinal front-end-wall outer-panel opposite side edges 76e;

a front-end-wall bottom panel 78 defined by the front-end-wall outer-panel score line 76s, a transverse front-end-wall bottom-panel score line 78s, and front-end-wall bottom-panel opposite side edges 78e; and a front-end-wall intermediate panel 80 defined by the front-end-wall bottom-panel score line 78s, a transverse front-end-wall intermediate-panel end edge 80ee, and front-end-wall intermediate-panel opposite side edges 80se.

As seen best by reference to both FIGS. 7 and 8, the foregoing panels and tabs of blank 50 are folded about their respective score lines to form the various walls of closable and openable box B'' as follows:

the bottom-wall panel 52 as defined by the front and rear score lines 52f and 52r and opposite side score lines 52s thereof forms the box bottom wall Bb'';

the opposite-side-wall outer side panels 54 are folded about the bottom-wall-panel opposite side score lines 52s, respectively, into spaced confronting relation with each other;

the opposite-side-wall top panels 56 are folded about the opposite-side-wall outer-side-panel score lines 54s, respectively, into spaced confronting relation with opposite side portions 52p of the bottom-wall panel 52 respectively;

the opposite-side-wall inner side panels 58 are folded about the opposite-side-wall top-panel score lines 56s, respectively, into spaced confronting relation with each other and with the folded opposite-side-wall outer side panels 54 respectively;

the opposite-side-wall bottom panels 60 are folded about the opposite-side-wall inner-side-panel score lines 58s, respectively, into adjacent confronting relation with the opposite side portions 52p of the bottom-wall panel 52, respectively, and into spaced confronting relation with the folded opposite-side-wall top panels 56 respectively;

the top-wall outer side panels 68 are folded about the top-wall-panel opposite side score lines 66ss, respectively, into spaced confronting relation with each other;

the top-wall inner side panels 72 are folded about the top-wall outer-side-panel side score lines 68ss, respectively, into spaced confronting relation with each other and into adjacent confronting relation with the folded top-wall outer side panels 68 respectively;

the top-wall inner-side-panel flaps 74 are folded about the top-wall inner-side-panel score lines 72s, respectively, toward and into substantial alignment with each other and into adjacent confronting relation with opposite side portions 66p of the top-wall panel 66 respectively;

the top-wall outer-side-panel tuck-in tabs 70 are folded about the top-wall outer-side-panel front score lines 68fs, respectively, toward and into substantial alignment with each other;

the front-end-wall outer panel 76 is folded about the top-wall-panel front score line 66fs into adjacent confronting relation with the folded top-wall outer-side-panel tuck-in tabs 70;

the front-end-wall bottom panel 78 is folded about the front-end-wall outer-panel score line 76s into confronting relation with edges of the folded top-wall outer-side-panel tuck-in tabs 70;

the front-end-wall intermediate panel 80 is folded about the front-end-wall bottom-panel score line 78s into adjacent confronting relation with the folded top-wall outer-side-panel tuck-in tabs 70;

the front-end-wall inner panel 62 is folded about the bottom-wall-panel front score line 52f so as to move opposite side portions 62p of the inner panel 62 into adjacent confronting relation with the front edges 54f, 56f, 58f, and 60f of the folded opposite-side-wall panels 54, 56, 58, and 60 respectively;

the rear-end-wall panel 64 is folded about the bottom-wall-panel rear score line 52r so as to move opposite side portions 64p of the rear-end-wall panel 64 into adjacent confronting relation with the rear edges 54r, 56r, 58r, and 60r of the folded opposite-side-wall panels 54, 56, 58, and 60 respectively; and the top-wall panel 66 is then folded forwardly and downwardly about the rear-end-wall-panel score line 64s so as to move the folded top-wall inner-side-panel flaps 74 into adjacent confronting relation with the folded opposite-side-wall top panels 56 respectively, and a central area of the folded top-wall panel 66 into spaced confronting relation with a corresponding central area of the bottom-wall panel 52, so as to move the folded top-wall inner side panels 72 into adjacent confronting relation with the folded opposite-side-wall outer side panels 54 respectively, and so as to move the folded front-end-wall intermediate panel 80 into adjacent confronting relation with the folded front-end-wall inner panel 62, and thereby close the box B'';

whereupon the opposite-side-wall outer side, top, inner side, and bottom panels 54, 56, 58, and 60 as folded, together with the top-wall outer side and inner side panels 68 and 72 as folded, form the closed box opposite side walls Bs'' respectively, the rear-end-wall panel 64 as folded forms the closed box rear end wall Br'', the top-wall panel 66 and inner-side-panel flaps 74 as folded form the closed box top wall Bt'', and the front-end-wall inner panel 62 as folded, together with the front-end-wall outer, bottom, and intermediate panels 76, 78, and 80 as folded, forms the closed box front end wall Bf'';

the folded top-wall panel 66 also being foldable upwardly and rearwardly about the rear-end-wall-panel score line 64s in order to move the folded top-wall inner-side-panel flaps 74 and inner side panels 72 away from the folded opposite-side-wall top and outer side panels 56 and 54 respectively, and the folded front-end-wall outer, bottom, and intermediate panels 76, 78, and 80 away from the folded front-end-wall inner panel 62, to thereby allow access to the inner panel 62; and the folded front-end-wall inner panel 62 then being foldable about the bottom-wall-panel front score line 52f to move the inner panel 62 away from the front edges 54f, 56f, 58f, and 60f of the folded opposite-side-wall panels 54, 56, 58, and 60, and thereby open the box B" to gain access to an article therein such as the film-sheet container described above with reference to the first embodiment.

FIG. 8 corresponds to FIG. 6 in depicting box B" as partially opened (film-sheet container not shown) with product-information label Lf" thereon. Although not illustrated here, the front end of the container foil is intended to be adhered to the front-end-wall intermediate panel 80 via double-backed tape, as in the first and second embodiments, to ensure light-tightness when box B" is reclosed. This embodiment not only eliminates the tuck-in tabs 32 and slots S used in the previous embodiments, but it also allows the top wall Bt" to be opened fully to provide more convenient access to the enclosed article.

With respect to all three embodiments described above, it should be understood that certain of the folded panels and tabs are to be secured in their respective adjacent confronting relationships by adhesive means provided at their interface. Such means may conveniently comprise any commonly used case-sealing hot-melt glue applied to either of the facing surfaces. For example, in the first and second embodiments, the folded opposite-side-wall bottom panels 20 would be glued to the adjacently confronting opposite side portions 12p of bottom-wall panel 12, and the folded front-end-wall outer and intermediate panels 40 and 44 would be glued to each other and to the folded tuck-in tabs 38 interposed therebetween. Similarly, in the third embodiment, the folded opposite-side-wall bottom panels 60 would be glued to the adjacently confronting opposite side portions 52p of bottom-wall panel 52, the folded top-wall inner-side-panel flaps 74 would be glued to the adjacently confronting opposite side portions 66p of top-wall panel 66, and the folded front-end-wall outer and intermediate panels 76 and 80 would be glued to each other and to the folded tuck-in tabs 70 interposed therebetween.

Also with regard to all three embodiments, the box-forming blanks can be die-cut and scored from flat corrugated paperboard stock, and then be shipped and stored flat until ready for use. When folded around a compatible article to be packaged, such as the aforementioned rectanguloid film-sheet container, a light-tight carrying box is formed with a light-tight flip-top lid, which facilitates opening for article access and subsequent reclosing for light-tight article storage. Because the box is formed from durable corrugated stock, and affords impact protection by virtue of its opposite-side-wall spaced-panel "aircells" and its multi-panel front end wall, it can also be safely used as a shipping case without need of further packaging. As a result of this invention, therefore, significant savings in material, labor, and storage and handling costs, as well as enhanced convenience in use, can all be realized.

While the present invention has been described in detail with particular reference to its three embodiments illustrated herein, it will be appreciated by those skilled in the art that further variations and modifications can also be effected within the spirit and scope of this invention.

I claim:

1. A package for securely containing a generally rectanguloid article, said package comprising a rectanguloid box that is closable to enclose the article and openable to allow access thereto, said box when closed having a bottom wall, opposite side walls, a rear end wall, a top wall, and a front end wall, said box walls being formed from a single pre-cut and -scored blank of corrugated paperboard including:

a rectangular bottom-wall panel defined by transverse front and rear score lines and longitudinal opposite side score lines;

rectangular opposite-side-wall outer side panels defined by said bottom-wall-panel opposite side score lines respectively, longitudinal opposite-side-wall outer-side-panel score lines respectively, and transverse opposite-side-wall outer-side-panel front and rear edges;

opposite-side-wall top panels defined by said opposite-side-wall outer-side-panel score lines respectively, longitudinal opposite-side-wall top-panel score lines respectively, and transverse opposite-side-wall top-panel front and rear edges;

opposite-side-wall inner side panels defined by said opposite-side-wall top-panel score lines respectively, longitudinal opposite-side-wall inner-side-panel score lines respectively, and transverse opposite-side-wall inner-side-panel front and rear edges;

opposite-side-wall bottom panels defined by said opposite-side-wall inner-side-panel score lines respectively, longitudinal opposite-side-wall bottom-panel side edges respectively, and transverse opposite-side-wall bottom-panel front and rear edges;

a front-end-wall inner panel defined by said bottom-wall-panel front score line, a substantially transverse front-end-wall inner-panel boundary, and front-end-wall inner-panel opposite side edges;

a rectangular rear-end-wall panel defined by said bottom-wall-panel rear score line, a transverse rear-end-wall-panel score line, and longitudinal rear-end-wall-panel opposite side edges;

a rectangular top-wall panel defined by said rear-end-wall-panel score line, a transverse top-wall-panel score line, and longitudinal top-wall-panel opposite side boundaries;

top-wall side panels defined by at least forward portions of said top-wall-panel opposite side boundaries respectively, respective top-wall side-panel side and rear boundaries, and respective transverse top-wall side-panel front score lines disposed substantially in alignment with said top-wall-panel score line;

top-wall side-panel tuck-in tabs extending substantially longitudinally from said top-wall side-panel front score lines respectively to top-wall side-panel tuck-in-tab outer edges respectively;

a rectangular front-end-wall outer panel defined by said top-wall-panel score line, a transverse front-end-wall outer-panel score line, and longitudinal front-end-wall outer-panel opposite side edges;

a front-end-wall bottom panel defined by said front-end-wall outer-panel score line, a transverse front-end-wall bottom-panel score line, and front-end-wall bottom-panel opposite side edges; and a front-end-wall intermediate panel defined by said front-end-wall bottom-panel score line, a transverse front-end-wall intermediate-panel end edge, and front-end-wall intermediate-panel opposite side edges;

said bottom-wall panel as defined by said front and rear score lines and opposite side score lines thereof forming said box bottom wall;

said opposite-side-wall outer side panels being folded about said bottom-wall-panel opposite side score lines, respectively, into spaced confronting relation with each other;

said opposite-side-wall top panels being folded about said opposite-side-wall outer-side-panel score lines, respectively, into spaced confronting relation with opposite side portions of said bottom-wall panel respectively;

said opposite-side-wall inner side panels being folded about said opposite-side-wall top-panel score lines, respectively, into spaced confronting relation with each other and with said folded opposite-side-wall outer side panels respectively;

said opposite-side-wall bottom panels being folded about said opposite-side-wall inner-side-panel score lines, respectively, into adjacent confronting relation with said opposite side portions of said bottom-wall panel, respectively, and into spaced confronting relation with said folded opposite-side-wall top panels respectively;

said top-wall side panels being folded about said at least forward portions of said top-wall panel opposite side boundaries, respectively, into spaced confronting relation with each other;

said top-wall side-panel tuck-in tabs being folded about said top-wall side-panel front score lines, respectively, toward and into substantial alignment with each other;

said front-end wall outer panel being folded about said top-wall-panel score line into adjacent confronting relation with said folded top-wall side-panel tuck-in tabs;

said front-end-wall bottom panel being folded about said front-end-wall outer-panel score line into confronting relation with edges of said folded top-wall side-panel tuck-in tabs;

said front-end-wall intermediate panel being folded about said front-end-wall bottom-panel score line into adjacent confronting relation with said folded top-wall side-panel tuck-in tabs;

said front-end-wall inner panel being folded about said bottom-wall-panel front score line so as to move opposite side portions of said inner panel into adjacent confronting relation with said front edges of said folded opposite-side-wall panels respectively;

said rear-end-wall panel being folded about said bottom-wall-panel rear score line so as to move opposite side portions of said rear-end-wall panel into adjacent confronting relation with said rear edges of said folded opposite-side-wall panels respectively; and said top-wall panel then being folded forwardly and downwardly about said rear-end-wall-panel score line so as to move opposite side portions of said folded top-wall panel into proximate relation with said folded opposite-side-wall top panels respectively, and said folded top-wall side panels into proximate relation with said folded opposite-side-wall outer side panels respectively, and so as to move said folded front-end-wall intermediate panel into adjacent confronting relation with said folded front-end-wall inner panel, and thereby close said box;

whereupon said opposite-side-wall outer side, top, inner side, and bottom panels as folded, together with said top-wall side panels as folded, form said closed box opposite side walls respectively, said rear-end-wall panel as folded forms said closed box rear end wall, said top-wall panel as folded forms at least part of said closed box top wall, and said front-end-wall inner panel as folded, together with said front-end-wall outer, bottom, and intermediate panels as folded, forms said closed box front end wall;

at least a forward part of said folded top-wall panel also being foldable upwardly and rearwardly in order to move said opposite side portions thereof and said folded top-wall side panels away from said folded opposite-side-wall top and outer side panels respectively, and said folded front-end-wall outer, bottom, and intermediate panels away from said folded front-end-wall inner panel, to thereby allow access to said inner panel; and said folded front-end-wall inner panel then being foldable about said bottom-wall-panel front score line to move said inner panel away from said front edges of said folded opposite-side-wall panels, and thereby open said box.

2. A package as claimed in claim 1 wherein:

said front-end-wall inner-panel boundary comprises at least one transverse front-end-wall inner-panel end edge;

said top-wall-panel score line comprises a transverse top-wall-panel front score line, and said top-wall-panel opposite side boundaries comprise longitudinal top-wall-panel opposite side score lines;

said top-wall side panels comprise rectangular top-wall outer side panels, said top-wall side-panel side and rear boundaries comprise longitudinal top-wall outer-side-panel side score lines and transverse top-wall outer-side-panel rear edges respectively, and said top-wall side-panel front score lines comprise transverse top-wall outer-side-panel front score lines;

said blank further includes —
top-wall inner side panels defined by said top-wall outer-side-panel side score lines respectively, longitudinal top-wall inner-side-panel score lines respectively, and transverse top-wall inner-side-panel rear and front edges, and top-wall inner-side-panel flaps defined by said top-wall inner-side-panel score lines respectively, longitudinal top-wall inner-side-panel-flap side edges respectively, and transverse top-wall inner-side-panel-flap rear and front edges;

said top-wall inner side panels are folded about said top-wall outer-side-panel side score lines, respectively, into spaced confronting relation with each other and into adjacent confronting relation with said folded top-wall outer side panels respectively;

said top-wall inner-side-panel flaps are folded about said top-wall inner-side-panel score lines, respectively, toward and into substantial alignment with each other and into adjacent confronting relation with opposite side portions of said top-wall panel respectively;

said top-wall panel is folded forwardly and downwardly about said rear-end-wall-panel score line so as to move said folded top-wall inner-side-panel flaps into adjacent confronting relation with said folded opposite-side-wall top panels respectively, and a central area of said folded top-wall panel into spaced confronting relation with a corresponding central area of said bottom-wall panel, and so as to move said folded top-wall inner side panels into adjacent confronting relation with said folded opposite-side-wall outer side panels respectively; and said folded top-wall panel is foldable upwardly and rearwardly about said rear-end-wall-panel score line in order to move said folded top-wall inner-side-panel flaps and inner side panels away from said folded opposite-side-wall top and outer side panels respectively.

3. A package as claimed in claim 1 wherein:

each of said opposite-side-wall top panels has a longitudinal slot therein parallel with and adjacent to a medial portion of said outer-side-panel score line;

said front-end-wall inner-panel boundary comprises at least one transverse front-end-wall inner-panel end edge;

said top-wall panel comprises rectangular top-wall rearward and forward panels, said top-wall rearward panel being defined by said rear-end-wall-panel score line, a transverse top-wall rearward-panel forward score line, longitudinal top-wall rearward-panel rearward opposite side edges extending normally from respective opposite ends of said rear-end-wall-panel score line, longitudinal top-wall rearward-panel forward opposite side edges extending normally from respective opposite ends of said top-wall rearward-panel forward score line, and longitudinal top-wall rearward-panel opposite side score lines extending respectively from said rearward opposite side edges to said forward opposite side edges, said top-wall forward panel being defined by said top-wall rearward-panel forward score line, a transverse top-wall forward-panel front score line, and longitudinal top-wall forward-panel opposite side score lines, said top-wall-panel score line comprising said top-wall forward-panel front score line, and said top-wall-panel opposite side boundaries comprising said top-wall rearward-panel rearward and forward opposite side edges and opposite side score lines and said top-wall forward-panel opposite side score lines;

said blank further includes top-wall rearward-panel opposite side tuck-in tabs extending laterally from said rearward-panel opposite side score lines respectively to rearward-panel opposite side tuck-in-tab outer edges respectively, each of said rearward-panel tuck-in tabs being configured to fit matingly into one of said opposite-side-wall top-panel slots;

said top-wall side panels comprise top-wall forward-panel opposite side panels, said top-wall side-panel side and rear boundaries comprise opposite-side-panel outer edges, and said top-wall side-panel front score lines comprise transverse opposite-side-panel score lines disposed substantially in alignment with said forward-panel front score line, said opposite side panels being defined by said forward-panel opposite side score lines respectively, said opposite-side-panel outer edges respectively, and said opposite-side-panel score lines respectively;

said top-wall side-panel tuck-in tabs comprise opposite-side-panel tuck-in tabs extending substantially longitudinally from said opposite-side-panel score lines respectively to opposite-side-panel tuck-in-tab outer edges respectively;

said top-wall rearward-panel opposite side tuck-in tabs are folded about said rearward-panel opposite side score lines, respectively, into spaced confronting relation with each other;

said top-wall forward-panel opposite side panels are folded about said forward-panel opposite side score lines, respectively, into spaced confronting relation with each other;

said opposite-side-panel tuck-in tabs are folded about said opposite-side-panel score lines, respectively, toward and into substantial alignment with each other;

said front-end-wall outer panel is folded about said top-wall forward-panel front score line into adjacent confronting relation with said folded opposite-side-panel tuck-in tabs;

said front-end-wall bottom panel is folded about said front-end-wall outer-panel score line into confronting relation with edges of said folded opposite-side-panel tuck-in tabs;

said front-end-wall intermediate panel is folded about said front-end-wall bottom-panel score line into adjacent confronting relation with said folded opposite-side-panel tuck-in tabs;

said top-wall rearward and forward panels together are folded forwardly and downwardly about said rear-end-wall-panel score line so as to move said folded top-wall rearward-panel tuck-in tabs into said slots in said folded opposite-side-wall top panels respectively, so as to move opposite side portions of said folded top-wall panels into adjacent confronting relation with said folded opposite-side-wall top panels respectively, and central portions of said folded top-wall panels into spaced confronting relation with corresponding central portions of said bottom-wall panel, so as to move said folded top-wall forward-panel opposite side panels into adjacent confronting relation with said folded opposite-side-wall outer side panels respectively, and so as to move said folded front-end-wall intermediate panel into adjacent confronting relation with said folded front-end-wall inner panel, and thereby close said box, said top-wall rearward and forward panels as folded together forming said closed box top wall; and said top-wall forward panel is foldable upwardly and rearwardly about said top-wall rearward-panel forward score line in order to move said forward panel and folded opposite side panels away from said folded opposite-side-wall top and outer side panels respectively, and said folded front-end-wall outer, bottom, and intermediate panels away from said folded front-end-wall inner panel, to thereby allow access to said inner panel.

4. A package as claimed in claim 1 wherein:

each of said opposite-side-wall top panels has a longitudinal slot therein parallel with and adjacent to a medial portion of said outer-side-panel score line;

said front-end-wall inner-panel boundary comprises a transverse front-end-wall inner-panel score line;

said blank further includes— a top-wall inner panel defined by said front-end-wall inner-panel score line, a transverse top-wall inner-panel end edge, top-wall inner-panel opposite side edges extending from respective opposite ends of said front-end-wall inner-panel score line toward said top-wall inner-panel end edge, and top-wall inner-panel opposite side score lines extending from respective opposite ends of said top-wall inner-panel end edge to said top-wall inner-panel opposite side edges respectively, and top-wall inner-panel opposite side tuck-in tabs extending laterally from said top-wall inner-panel opposite side score lines respectively to top-wall inner-panel opposite side tuck-in-tab outer edges respectively, each of said top-wall inner-panel tuck-in tabs being configured to fit matingly into one of said opposite-side-wall top-panel slots;

said top-wall panel comprises rectangular top-wall rearward and forward outer panels, said top-wall rearward outer panel being defined by said rear-end-wall-panel score line, a transverse top-wall rearward-outer-panel forward score line, longitudinal top-wall rearward-outer-panel rearward opposite side edges extending normally from respective opposite ends of said rear-end-wall-panel score line, longitudinal top-wall rearward-outer-panel forward opposite side edges extending normally from respective opposite ends of said top-wall rearward-outer-panel forward score line, and longitudinal top-wall rearward-outer-panel opposite side score lines extending respectively from said rearward opposite side edges to said forward opposite side edges, said top-wall forward outer panel being defined by said top-wall rearward-outer-panel forward score line, a transverse top-wall forward-outer-panel front score line, and longitudinal top-wall forward-outer-panel opposite side score lines, said top-wall-panel score line comprising said top-wall forward-outer-panel front score line, and said top-wall-panel opposite side boundaries comprising said top-wall rearward-outer-panel rearward and forward opposite side edges and opposite side score lines and said top-wall forward-outer-panel opposite side score lines;

said blank further includes top-wall rearward-outer-panel opposite side tuck-in tabs extending laterally from said rearward-outer-panel opposite side score lines respectively to rearward-outer-panel opposite side tuck-in-tab outer edges respectively, each of said rearward-outer-panel tuck-in tabs being configured to fit matingly into one of said opposite-side-wall top-panel slots;

said top-wall side panels comprise top-wall forward-outer-panel opposite side panels, said top-wall side-panel side and rear boundaries comprise opposite-side-panel outer edges, and said top-wall side-panel front score lines comprise transverse opposite-side-panel score lines disposed substantially in alignment with said forward-outer-panel front score line, said opposite side panels being defined by said forward-outer-panel opposite side score lines respectively, said opposite-side-panel outer edges respectively, and said opposite-side-panel score lines respectively;

said top-wall side-panel tuck-in tabs comprise opposite-side-panel tuck-in tabs extending substantially longitudinally from said opposite-side-panel score lines respectively to opposite-side-panel tuck-in-tab outer edges respectively;

said top-wall inner-panel opposite side tuck-in tabs are folded about said top-wall inner-panel opposite side score lines, respectively, into spaced confronting relation with each other;

said top-wall rearward-outer-panel opposite side tuck-in tabs are folded about said rearward-outer-panel opposite side score lines, respectively, into spaced confronting relation with each other;

said top-wall forward-outer-panel opposite side panels are folded about said forward-outer-panel opposite side score lines, respectively, into spaced confronting relation with each other;

said opposite-side-panel tuck-in tabs are folded about said opposite-side-panel score lines, respectively, toward and into substantial alignment with each other;

said front-end-wall outer panel is folded about said top-wall forward-outer-panel front score line into adjacent confronting relation with said folded opposite-side-panel tuck-in tabs;

said front-end-wall bottom panel is folded about said front-end-wall outer-panel score line into confronting relation with edges of said folded opposite-side-panel tuck-in tabs;

said front-end-wall intermediate panel is folded about said front-end-wall bottom-panel score line into adjacent confronting relation with said folded opposite-side-panel tuck-in tabs;

said front-end-wall inner panel being folded about said bottom-wall-panel front score line so as to move opposite side portions of said inner panel into adjacent confronting relation with said front edges of said folded opposite-side-wall panels respectively;

said rear-end-wall panel being folded about said bottom-wall-panel rear score line so as to move opposite side portions of said rear-end-wall panel into adjacent confronting relation with said rear edges of said folded opposite-side-wall panels respectively;

said top-wall inner panel is folded rearwardly and downwardly about said front-end-wall inner-panel score line so as to move said top-wall inner-panel tuck-in tabs into said slots in said folded opposite-side-wall top panels, respectively, and so as to move opposite side portions of said top-wall inner panel into adjacent confronting relation with said folded opposite-side-wall top panels, respectively;

said top-wall rearward and forward outer panels together are folded forwardly and downwardly about said rear-end-wall-panel score line so as to move said folded top-wall rearward-outer-panel tuck-in tabs into said slots in said folded opposite-side-wall top panels respectively, so as to move opposite said portions of said top-wall rearward outer panel into adjacent confronting relation with said folded opposite-side-wall top panels respectively, and said top-wall forward outer panel into adjacent confronting relation with said folded top-wall inner panel, so as to move said folded top-wall forward-outer-panel opposite side panels into adjacent confronting relation with said folded opposite-side-wall outer side panels respectively, and so as to move said folded front-end-wall intermediate panel into adjacent confronting relation with said folded front-end-wall inner panel, and thereby close said box, said top-wall inner and outer panels as folded together forming said closed box top wall;

said top-wall forward outer panel is foldable upwardly and rearwardly about said top-wall rearward-outer-panel forward score line in order to move said forward outer panel and said folded opposite side panels away from said folded top-wall inner panel and said folded opposite-side-wall outer side panels respectively, and said folded front-end-wall outer, bottom, and intermediate panels away from said folded front-end-wall inner panel, and thereby allow access to said top-wall and front-end-wall inner panels; and said folded top-wall and front-end-wall inner panels then are foldable upwardly and forwardly about said front-end-wall inner-panel score line and said bottom-wall-panel front score line, respectively, to move said inner panels away from said folded opposite-side-wall top panels and front edges, respectively, and thereby open said box.

5. A package for securely containing a generally rectanguloid article, said package comprising a rectanguloid box that is closable to enclose the article and openable to allow access thereto, said box when closed having a bottom wall, opposite side walls, a rear end wall, a top wall, and a front end wall, said box walls being formed from a single pre-cut and -scored blank of corrugated paperboard including:

a rectangular bottom-wall panel defined by transverse front and rear score lines and longitudinal opposite side score lines;

rectangular opposite-side-wall outer side panels defined by said bottom-wall-panel opposite side score lines respectively, longitudinal opposite-side-wall outer-side-panel score lines respectively, and transverse opposite-side-wall outer-side-panel front and rear edges;

opposite-side-wall top panels defined by said opposite-side-wall outer-side-panel score lines respectively, longitudinal opposite-side-wall top-panel score lines respectively, and transverse opposite-side-wall top-panel front and rear edges;

opposite-side-wall inner side panels defined by said opposite-side-wall top-panel score lines respectively, longitudinal opposite-side-wall inner-side-panel score lines respectively, and transverse opposite-side-wall inner-side-panel front and rear edges;

opposite-side-wall bottom panels defined by said opposite-side-wall inner-side-panel score lines respectively, longitudinal opposite-side-wall bottom-panel side edges respectively, and transverse opposite-side-wall bottom-panel front and rear edges;

a front-end-wall inner panel defined by said bottom-wall-panel front score line, at least one transverse front-end-wall inner-panel end edge, and front-end-wall inner-panel opposite side edges;

a rectangular rear-end-wall panel defined by said bottom-wall-panel rear score line, a transverse rear-end-wall-panel score line, and longitudinal rear-end-wall-panel opposite side edges;

a rectangular top-wall panel defined by said rear-end-wall-panel score line, a transverse top-wall-panel front score line, and longitudinal top-wall-panel opposite side score lines;

rectangular top-wall outer side panels defined by said top-wall-panel opposite side score lines respectively, longitudinal top-wall outer-side-panel side score lines respectively, respective transverse top-wall outer-side-panel rear edges, and respective transverse top-wall outer-side-panel front score lines disposed substantially in alignment with said top-wall-panel front score line;

top-wall outer-side-panel tuck-in tabs extending substantially longitudinally from said top-wall outer-side-panel front score lines respectively to top-wall outer-side-panel tuck-in-tab outer edges respectively;

top-wall inner side panels defined by said top-wall outer-side-panel side score lines respectively, longitudinal top-wall inner-side-panel score lines respectively, and transverse top-wall inner-side-panel rear and front edges;

top-wall inner-side-panel flaps defined by said top-wall inner-side-panel score lines respectively, longitudinal top-wall inner-side-panel-flap side edges respectively, and transverse top-wall inner-side-panel-flap rear and front edges;

a rectangular front-end-wall outer panel defined by said top-wall-panel front score line, a transverse front-end-wall outer-panel score line, and longitudinal front-end-wall outer-panel opposite side edges;

a front-end-wall bottom panel defined by said front-end-wall outer-panel score line, a transverse front-end-wall bottom-panel score line, and front-end-wall bottom-panel opposite side edges; and a front-end-wall intermediate panel defined by said front-end-wall bottom-panel score line, a transverse front-end-wall intermediate-panel end edge, and front-end-wall intermediate-panel opposite side edges;

said bottom-wall panel as defined by said front and rear score lines and opposite side score lines thereof forming said box bottom wall;

said opposite-side-wall outer side panels being folded about said bottom-wall-panel opposite side score lines, respectively, into spaced confronting relation with each other;

said opposite-side-wall top panels being folded about said opposite-side-wall outer-side-panel score lines, respectively, into spaced confronting relation with opposite side portions of said bottom-wall panel respectively;

said opposite-side-wall inner side panels being folded about said opposite-side-wall top-panel score lines, respectively, into spaced confronting relation with each other and with said folded opposite-side-wall outer side panels respectively;

said opposite-side-wall bottom panels being folded about said opposite-side-wall inner-side-panel score lines, respectively, into adjacent confronting relation with said opposite side portions of said bottom-wall panel, respectively, and into spaced confronting relation with said folded opposite-side-wall top panels respectively;

said top-wall outer side panels being folded about said top-wall-panel opposite side score lines, respectively, into spaced confronting relation with each other;

said top-wall inner side panels being folded about said top-wall outer-side-panel side score lines, respectively, into spaced confronting relation with each other and into adjacent confronting relation with said folded top-wall outer side panels respectively;

said top-wall inner-side-panel flaps being folded about said top-wall inner-side-panel score lines, respectively, toward and into substantial alignment with each other and into adjacent confronting relation with opposite side portions of said top-wall panel respectively;

said top-wall outer-side-panel tuck-in tabs being folded about said top-wall outer-side-panel front score lines, respectively, toward and into substantial alignment with each other;

said front-end-wall outer panel being folded about said top-wall-panel front score line into adjacent confronting relation with said folded top-wall outer-side-panel tuck-in tabs;

said front-end-wall bottom panel being folded about said front-end-wall outer-panel score line into confronting relation with edges of said folded top-wall outer-side-panel tuck-in tabs;

said front-end-wall intermediate panel being folded about said front-end-wall bottom-panel score line into adjacent confronting relation with said folded top-wall outer-side-panel tuck-in tabs;

said front-end-wall inner panel being folded about said bottom-wall-panel front score line so as to move opposite side portions of said inner panel into adjacent confronting relation with said front edges of said folded opposite-side-wall panels respectively;

said rear-end-wall panel being folded about said bottom-wall-panel rear score line so as to move opposite side portions of said rear-end-wall panel into adjacent confronting relation with said rear edges of said folded opposite-side-wall panels respectively; and said top-wall panel then being folded forwardly and downwardly about said rear-end-wall-panel score line so as to move said folded top-wall inner-side-panel flaps into adjacent confronting relation with said folded opposite-side-wall top panels respectively, and a central area of said folded top-wall panel into spaced confronting relation with a corresponding central area of said bottom-wall panel, so as to move said folded top-wall inner side panels into adjacent confronting relation with said folded opposite-side-wall outer side panels respectively, and so as to move said folded front-end-wall intermediate panel into adjacent confronting relation with said folded front-end-wall inner panel, and thereby close said box;

whereupon said opposite-side-wall outer side, top, inner side, and bottom panels as folded, together with said top-wall outer side and inner side panels as folded, form said closed box opposite side walls respectively, said rear-end-wall panel as folded forms said closed box rear end wall, said top-wall panel and inner-side-panel flaps as folded form said closed box top wall, and said front-end-wall inner panel as folded, together with said front-end-wall outer, bottom, and intermediate panels as folded, forms said closed box front end wall;

said folded top-wall panel also being foldable upwardly and rearwardly about said rear-end-wall-panel score line in order to move said folded top-wall inner-side-panel flaps and inner side panels away from said folded opposite-side-wall top and outer side panels respectively, and said folded front-end-wall outer, bottom, and intermediate panels away from said folded front-end-wall inner panel, to thereby allow access to said inner panel; and said folded front-end-wall inner panel then being foldable about said bottom-wall-panel front score line to move said inner panel away from said front edges of said folded opposite-side-wall panels, and thereby open said box.

6. A package for securely containing a generally rectanguloid article, said package comprising a rectanguloid box that is closable to enclose the article and openable to allow access thereto, said box when closed having a bottom wall, opposite side walls, a rear end wall, a top wall, and a front end wall, said box walls being formed from a single pre-cut and -scored blank of corrugated paperboard including:

a rectangular bottom-wall panel defined by transverse front and rear score lines and longitudinal opposite side score lines;

rectangular opposite-side-wall outer side panels defined by said bottom-wall-panel opposite side score lines respectively, longitudinal opposite-side-wall outer-side-panel score lines respectively, and transverse opposite-side-wall outer-side-panel front and rear edges;

opposite-side-wall top panels defined by said opposite-side-wall outer-side-panel score lines respectively, longitudinal opposite-side-wall top-panel score lines respectively, and transverse opposite-side-wall top-panel front and rear edges, each of said top panels having a longitudinal slot therein parallel with and adjacent to a medial portion of said outer-side-panel score line;

opposite-side-wall inner side panels defined by said opposite-side-wall top-panel score lines respectively, longitudinal opposite-side-wall inner-side-panel score lines respectively, and transverse opposite-side-wall inner-side-panel front and rear edges;

opposite-side-wall bottom panels defined by said opposite-side-wall inner-side-panel score lines respectively, longitudinal opposite-side-wall bottom-panel side edges respectively, and transverse opposite-side-wall bottom-panel front and rear edges;

a front-end-wall inner panel defined by said bottom-wall-panel front score line, at least one transverse front-end-wall inner-panel end edge, and front-end-wall inner-panel opposite side edges;

a rectangular rear-end-wall panel defined by said bottom-wall-panel rear score line, a transverse rear-end-wall-panel score line, and longitudinal rear-end-wall-panel opposite side edges;

a rectangular top-wall rearward panel defined by said rear-end-wall-panel score line, a transverse top-wall rearward-panel forward score line, longitudinal top-wall rearward-panel rearward opposite side edges extending normally from respective opposite ends of said rear-end-wall-panel score line, longitudinal top-wall rearward-panel forward opposite side edges extending normally from respective opposite ends of said top-wall rearward-panel forward score line, and longitudinal top-wall rearward-panel opposite side score lines extending respectively from said rearward opposite side edges to said forward opposite side edges; top-wall rearward-panel opposite side tuck-in tabs extending laterally from said rearward-panel opposite side score lines respectively to rearward-panel opposite side tuck-in-tab outer edges respectively, each of said rearward-panel tuck-in tabs being configured to fit matingly into one of said opposite-side-wall top-panel slots;

a rectangular top-wall forward panel defined by said top-wall rearward-panel forward score line, a transverse top-wall forward-panel front score line, and longitudinal top-wall forward-panel opposite side score lines;

top-wall forward-panel opposite side panels defined by said forward-panel opposite side score lines respectively, opposite-side-panel outer edges respectively, and respective transverse opposite-side-panel score lines disposed substantially in alignment with said forward-panel front score line;

opposite-side-panel tuck-in tabs extending substantially longitudinally from said opposite-side-panel score lines respectively to opposite-side-panel tuck-in-tab outer edges respectively;

a rectangular front-end-wall outer panel defined by said top-wall forward-panel front score line, a transverse front-end-wall outer-panel score line, and longitudinal front-end-wall outer-panel opposite side edges;

a front-end-wall bottom panel defined by said front-end-wall outer-panel score line, a transverse front-end-wall bottom-panel score line, and front-end-wall bottom-panel opposite side edges; and a front-end-wall intermediate panel defined by said front-end-wall bottom-panel score line, a transverse front-end-wall intermediate-panel end edge, and front-end-wall intermediate-panel opposite side edges;

said bottom-wall panel as defined by said front and rear score lines and opposite side score lines thereof forming said box bottom wall;

said opposite-side-wall outer side panels being folded about said bottom-wall-panel opposite side score lines, respectively, into spaced confronting relation with each other;

said opposite-side-wall top panels being folded about said opposite-side-wall outer-side-panel score lines, respectively, into spaced confronting relation with opposite side portions of said bottom-wall panel respectively;

said opposite-side-wall inner side panels being folded about said opposite-side-wall top-panel score lines, respectively, into spaced confronting relation with each other and with said folded opposite-side-wall outer side panels respectively;

said opposite-side-wall bottom panels being folded about said opposite-side-wall inner-side-panel score lines, respectively, into adjacent confronting relation with said opposite side portions of said bottom-wall panel, respectively, and into spaced confronting relation with said folded opposite-side-wall top panels respectively;

said top-wall rearward-panel opposite side tuck-in tabs being folded about said rearward-panel opposite side score lines, respectively, into spaced confronting relation with each other;

said top-wall forward-panel opposite side panels being folded about said forward-panel opposite side score lines, respectively, into spaced confronting relation with each other;

said opposite-side-panel tuck-in tabs being folded about said opposite-side-panel score lines, respectively, toward and into substantial alignment with each other;

said front-end-wall outer panel being folded about said top-wall forward-panel front score line into adjacent confronting relation with said folded opposite-side-panel tuck-in tabs;

said front-end-wall bottom panel being folded about said front-end-wall outer-panel score line into confronting relation with edges of said folded opposite-side-panel tuck-in tabs;

said front-end-wall intermediate panel being folded about said front-end-wall bottom-panel score line into adjacent confronting relation with said folded opposite-side-panel tuck-in tabs;

said front-end-wall inner panel being folded about said bottom-wall-panel front score line so as to move opposite side portions of said inner panel into adjacent confronting relation with said front edges of said folded opposite-side-wall panels respectively;

said rear-end-wall panel being folded about said bottom-wall-panel rear score line so as to move opposite side portions of said rear-end-wall panel into adjacent confronting relation with said rear edges of said folded opposite-side-wall panels respectively; and said top-wall rearward and forward panels together then being folded forwardly and downwardly about said rear-end-wall-panel score line so as to move said folded top-wall rearward-panel tuck-in tabs into said slots in said folded opposite-side-wall top panels respectively, so as to move opposite side portions of said folded top-wall panels into adjacent confronting relation with said folded opposite-side-wall top panels respectively, and central portions of said folded top-wall panels into spaced confronting relation with corresponding central portions of said bottom-wall panel, so as to move said folded top-wall forward-panel opposite side panels into adjacent confronting relation with said folded opposite-side-wall outer side panels respectively, and so as to move said folded front-end-wall intermediate panel into adjacent confronting relation with said folded front-end-wall inner panel, and thereby close said box;

whereupon said opposite-side-wall outer side, top, inner side, and bottom panels as folded, together with said top-wall forward-panel opposite side panels as folded, form said closed box opposite side walls respectively, said rear-end-wall panel as folded forms said closed box rear end wall, said top-wall rearward and forward panels as folded together form said closed box top wall, and said front-end-wall inner panel as folded, together with said front-end-wall outer, bottom, and intermediate panels as folded, forms said closed box front end wall;

said top-wall forward panel being foldable upwardly and rearwardly about said top-wall rearward-panel forward score line in order to move said forward panel and folded opposite side panels away from said folded opposite-side-wall top and outer side panels respectively, and said folded front-end-wall outer, bottom, and intermediate panels away from said folded front-end-wall inner panel, to thereby allow access to said inner panel; and said folded front-end-wall inner panel then being foldable about said bottom-wall-panel front score line to move said inner panel away from said front edges of said folded opposite-side-wall panels, and thereby open said box.

7. A package for securely containing a generally rectanguloid article, said package comprising a rectanguloid box that is closable to enclose the article and openable to allow access thereto, said box when closed having a bottom wall, opposite side walls, a rear end wall, a top wall, and a front end wall, said box walls being formed from a single pre-cut and -scored blank of corrugated paperboard including:

a rectangular bottom-wall panel defined by transverse front and rear score lines and longitudinal opposite side score lines;

rectangular opposite-side-wall outer side panels defined by said bottom-wall-panel opposite side score lines respectively, longitudinal opposite-side-wall outer-side-panel score lines respectively, and transverse opposite-side-wall outer-side-panel front and rear edges;

opposite-side-wall top panels defined by said opposite-side-wall outer-side-panel score lines respectively, longitudinal opposite-side-wall top-panel score lines respectively, and transverse opposite-side-wall top-panel front and rear edges, each of said top panels having a longitudinal slot therein parallel with and adjacent to a medial portion of said outer-side-panel score line;

opposite-side-wall inner side panels defined by said opposite-side-wall top-panel score lines respectively, longitudinal opposite-side-wall inner-side-panel score lines respectively, and transverse opposite-side-wall inner-side-panel front and rear edges;

opposite-side-wall bottom panels defined by said opposite-side-wall inner-side-panel score lines respectively, longitudinal opposite-side-wall bottom-panel side edges respectively, and transverse opposite-side-wall bottom-panel front and rear edges;

a front-end-wall inner panel defined by said bottom-wall-panel front score line, a transverse front-end-wall inner-panel score line, and front-end-wall inner-panel opposite side edges;

a top-wall inner panel defined by said front-end-wall inner-panel score line, a transverse top-wall inner-panel end edge, top-wall inner-panel opposite side edges extending from respective opposite ends of said front-end-wall inner-panel score line toward said top-wall inner-panel end edge, and top-wall inner-panel opposite side score lines extending from respective opposite ends of said top-wall inner-panel end edge to said top-wall inner-panel opposite side edges respectively;

top-wall inner-panel opposite side tuck-in tabs extending laterally from said top-wall inner-panel opposite side score lines respectively to top-wall inner-panel opposite side tuck-in-tab outer edges respectively, each of said top-wall inner-panel tuck-in tabs being configured to fit matingly into one of said opposite-side-wall top-panel slots;

a rectangular rear-end-wall panel defined by said bottom-wall-panel rear score line, a transverse rear-end-wall-panel score line, and longitudinal rear-end-wall-panel opposite side edges;

a rectangular top-wall rearward outer panel defined by said rear-end-wall-panel score line, a transverse top-wall rearward-outer-panel forward score line, longitudinal top-wall rearward-outer-panel rearward opposite side edges extending normally from respective opposite ends of said rear-end-wall-panel score line, longitudinal top-wall rearward-outer-panel forward opposite side edges extending normally from respective opposite ends of said top-wall rearward-outer-panel forward score line, and longitudinal top-wall rearward-outer-panel opposite side score lines extending respectively from said rearward opposite side edges to said forward opposite side edges;

top-wall rearward-outer-panel opposite side tuck-in tabs extending laterally from said rearward-outer-panel opposite side score lines respectively to rearward-outer-panel opposite side tuck-in-tab outer edges respectively, each of said rearward-outer-panel tuck-in tabs being configured to fit matingly into one of said opposite-side-wall top-panel slots;

a rectangular top-wall forward outer panel defined by said top-wall rearward-outer-panel forward score line, a transverse top-wall forward-outer-panel front score line, and longitudinal top-wall forward-outer-panel opposite side score lines;

top-wall forward-outer-panel opposite side panels defined by said forward-outer-panel opposite side score lines respectively, opposite-side-panel outer edges respectively, and respective transverse opposite-side-panel score lines disposed substantially in alignment with said forward-outer-panel front score line;

opposite-side-panel tuck-in tabs extending substantially longitudinally from said opposite-side-panel score lines respectively to opposite-side-panel tuck-in-tab outer edges respectively;

a rectangular front-end-wall outer panel defined by said top-wall forward-outer-panel front score line, a transverse front-end-wall outer-panel score line, and longitudinal front-end-wall outer-panel opposite side edges;

a front-end-wall bottom panel defined by said front-end-wall outer-panel score line, a transverse front-end-wall bottom-panel score line, and front-end-wall bottom-panel opposite side edges; and a front-end-wall intermediate panel defined by said front-end-wall bottom-panel score line, a transverse front-end-wall intermediate-panel end edge, and front-end-wall intermediate-panel opposite side edges;

said bottom-wall panel as defined by said front and rear score lines and opposite side score lines thereof forming said box bottom wall;

said opposite-side-wall outer side panels being folded about said bottom-wall-panel opposite side score lines, respectively, into spaced confronting relation with each other;

said opposite-side-wall top panels being folded about said opposite-side-wall outer-side-panel score lines, respectively, into spaced confronting relation with opposite side portions of said bottom-wall panel respectively;

said opposite-side-wall inner side panels being folded about said opposite-side-wall top-panel score lines, respectively, into spaced confronting relation with each other and with said folded opposite-side-wall outer side panels respectively;

said opposite-side-wall bottom panels being folded about said opposite-side-wall inner-side-panel score lines, respectively, into adjacent confronting relation with said opposite side portions of said bottom-wall panel, respectively, and into spaced confronting relation with said folded opposite-side-wall top panels respectively;

said top-wall inner-panel opposite side tuck-in tabs being folded about said top-wall inner-panel opposite side score lines, respectively, into spaced confronting relation with each other;

said top-wall rearward-outer-panel opposite side tuck-in tabs being folded about said rearward-outer-panel opposite side score lines, respectively, into spaced confronting relation with each other;

said top-wall forward-outer-panel opposite side panels being folded about said forward-outer-panel opposite side score lines, respectively, into spaced confronting relation with each other;

said opposite-side-panel tuck-in tabs being folded about said opposite-side-panel score lines, respectively, toward and into substantial alignment with each other;

said front-end-wall outer panel being folded about said top-wall forward-outer-panel front score line into adjacent confronting relation with said folded opposite-side-panel tuck-in tabs;

said front-end-wall bottom panel being folded about said front-end-wall outer-panel score line into confronting relation with edges of said folded opposite-side-panel tuck-in tabs;

said front-end-wall intermediate panel being folded about said front-end-wall bottom-panel score line into adjacent confronting relation with said folded opposite-side-panel tuck-in tabs;

said front-end-wall inner panel being folded about said bottom-wall-panel front score line so as to move opposite side portions of said inner panel into adjacent confronting relation with said front edges of said folded opposite-side-wall panels respectively;

said rear-end-wall panel being folded about said bottom-wall-panel rear score line so as to move opposite side portions of said rear-end-wall panel into adjacent confronting relation with said rear edges of said folded opposite-side-wall panels respectively;

said top-wall inner panel being folded rearwardly and downwardly about said front-end-wall inner-panel score line so as to move said folded top-wall inner-panel tuck-in tabs into said slots in said folded opposite-side-wall top panels respectively, and so as to move opposite side portions of said top-wall inner panel into adjacent confronting relation with said folded opposite-side-wall top panels respectively; and said top-wall rearward and forward outer panels together then being folded forwardly and downwardly about said rear-end-wall-panel score line so as to move said folded top-wall rearward-outer-panel tuck-in tabs into said slots in said folded opposite-side-wall top panels respectively, so as to move opposite side portions of said top-wall rearward outer panel into adjacent confronting relation with said folded opposite-side-wall top panels respectively, and said top-wall forward outer panel into adjacent confronting relation with said folded top-wall inner panel, so as to move said folded top-wall forward-outer-panel opposite side panels into adjacent confronting relation with said folded opposite-side-wall outer side panels respectively, and so as to move said folded front-end-wall intermediate panel into adjacent confronting relation with said folded front-end-wall inner panel, and thereby close said box;

whereupon said opposite-side-wall outer side, top, inner side, and bottom panels as folded, together with said top-wall forward-outer-panel opposite side panels as folded, form said closed box opposite side walls respectively, said rear-end-wall panel as folded forms said closed box rear end wall, said top-wall inner and outer panels as folded together form said closed box top wall, and said front-end-wall inner panel as folded, together with said front-end-wall outer, bottom, and intermediate panels as folded, forms said closed box front end wall;

said top-wall forward outer panel being foldable upwardly and rearwardly about said top-wall rearward-outer-panel forward score line in order to move said forward outer panel and said folded opposite side panels away from said folded top-wall inner panel and said folded opposite-side-wall outer side panels respectively, and said folded front-end-wall outer, bottom, and intermediate panels away from said folded front-end-wall inner panel, and thereby allow access to said top-wall and front-end-wall inner panels; and said folded top-wall and front-end-wall inner panels then being foldable upwardly and forwardly about said front-end-wall inner-panel score line and said bottom-wall-panel front score line, respectively, to move said inner panels away from said folded opposite-side-wall top panels and front edges, respectively, and thereby open said box.

* * * * *